(12) United States Patent
Karlsson et al.

(10) Patent No.: US 10,110,112 B2
(45) Date of Patent: Oct. 23, 2018

(54) SWITCHED MODE POWER SUPPLY COMPENSATION LOOP

(71) Applicant: Telefonaktiebolaget LM Ericsson (publ), Stockholm (SE)

(72) Inventors: Magnus Karlsson, Oskarshamn (SE); Torbjorn Holmberg, Kalmar (SE); Andreas Larsson, Kalmar (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 61 days.

(21) Appl. No.: 15/125,539

(22) PCT Filed: Aug. 27, 2015

(86) PCT No.: PCT/EP2015/069635
§ 371 (c)(1),
(2) Date: Sep. 12, 2016

(87) PCT Pub. No.: WO2017/032420
PCT Pub. Date: Mar. 2, 2017

(65) Prior Publication Data
US 2017/0264185 A1 Sep. 14, 2017

(51) Int. Cl.
| H02J 1/02 | (2006.01) |
| H02M 1/12 | (2006.01) |
| H02M 1/14 | (2006.01) |
| H02M 1/08 | (2006.01) |
| H02M 1/00 | (2006.01) |

(52) U.S. Cl.
CPC .............. *H02M 1/12* (2013.01); *H02M 1/08* (2013.01); *H02M 1/14* (2013.01); *H02M 2001/0016* (2013.01)

(58) Field of Classification Search
CPC .......................... H02J 1/02; H02M 2001/0016
USPC .......... 363/18, 19, 21.02, 39, 44–49, 53, 82, 363/123, 125, 126, 127
See application file for complete search history.

(56) References Cited

U.S. PATENT DOCUMENTS

| 6,198,265 B1 * | 3/2001 | Stevenson ............... G05F 1/575 323/288 |
| 7,778,053 B2 * | 8/2010 | Gritter ............... H02M 7/53873 307/105 |
| 7,952,900 B2 * | 5/2011 | Tomiyoshi .......... H02M 3/1582 363/132 |

(Continued)

*Primary Examiner* — Adolf Berhane
*Assistant Examiner* — Nusrat Quddus
(74) *Attorney, Agent, or Firm* — Boisbrun Hofman, PLLC

(57) ABSTRACT

A controller, and related method, configured to generate a duty cycle control signal for controlling an output voltage of a switched mode power supply as a function of a reference signal. In one embodiment, the controller is configured to sample a signal indicative of the output voltage to generate a first sampled signal, filter out a ripple component of the first sampled signal to generate a filtered signal, and generate a feedback control signal based on the filtered signal. The controller is also configured to sample a signal indicative of an input voltage of the switched mode power supply to generate a second sampled signal, generate a feed-forward control signal based on the second sampled signal and a feed-forward reference voltage, and generate the duty cycle control signal based on the feedback control signal and the feed-forward control signal.

20 Claims, 21 Drawing Sheets

(56) References Cited

U.S. PATENT DOCUMENTS

| | | | | |
|---|---|---|---|---|
| 8,526,203 B2* | 9/2013 | Huang | .............. | H02M 3/33523 |
| | | | | 363/21.16 |
| 2008/0002439 A1* | 1/2008 | Allinder | .............. | H02M 1/4208 |
| | | | | 363/21.01 |
| 2013/0038306 A1* | 2/2013 | Kelly | .................... | H02M 3/156 |
| | | | | 323/283 |
| 2013/0272033 A1* | 10/2013 | Zhang | ............... | H02M 3/33523 |
| | | | | 363/21.01 |
| 2014/0022824 A1* | 1/2014 | Huang | .............. | H02M 3/33523 |
| | | | | 363/21.12 |
| 2015/0137785 A1* | 5/2015 | Stevens | ................ | H02M 3/157 |
| | | | | 323/283 |

* cited by examiner

SWITCHED MODE POWER SUPPLY COMPENSATION LOOP

CROSS-REFERENCE TO RELATED APPLICATIONS

This application is the National Stage of, and therefore claims the benefit of, International Application No. PCT/EP2015/069635 filed on Aug. 27, 2015, entitled "Switched Mode Power Supply Compensation Loop". The above application is commonly assigned with this National Stage application and is incorporated herein by reference in its entirety.

TECHNICAL FIELD

The present invention generally relates to the field of switched mode power supplies (sometimes referred to as switch mode power supplies or switching mode power supplies) and more specifically to the control loop of a switched mode power supply that is used to regulate the power supply's output voltage.

BACKGROUND

The switched mode power supply (SMPS) is a well-known type of power converter having a diverse range of applications by virtue of its small size and weight and high efficiency, for example in personal computers and portable electronic devices such as cell phones. A SMPS achieves these advantages by switching one or more switching elements such as power MOSFETs at a high frequency (usually tens to hundreds of kHz), with the frequency or duty cycle of the switching being adjusted by a feedback loop (also widely referred to as a "compensation loop" or "feedback circuit") to convert an input voltage to a desired output voltage. A SMPS may take the form of a rectifier (AC/DC converter), a DC/DC converter, a frequency changer (AC/AC) or an inverter (DC/AC).

The feedback loop of a conventional SMPS 10 is illustrated in FIG. 1A. The feedback loop comprises an error signal generator 20 arranged to generate an error signal indicative of the difference between the output voltage, $V_{out}$, of the SMPS 10 and a reference voltage, $V_{ref}$. The error signal is then sampled by the sample and hold (S&H) circuit 30. The feedback look also has a controller 40 that generates, based on the sampled error signal and in accordance with a control law defined by one or more control law parameters, a control signal D that can be used for regulating the switching frequency or the switching duty cycle of the switching element(s) in the powertrain 50 of the SMPS 10, to keep the output voltage $V_{out}$ in the vicinity of a predetermined value. The controller 40 may, as in the present example, be a Proportional-Integral-Derivative (PID) controller that regulates the duty cycle (or the switching frequency, as the case may be) of the switching element(s) to keep the output voltage of the SMPS 10 substantially constant, in accordance with a PID control law that is characterised by the values of the P, I and D control parameters set in the PID controller.

Variations in the input voltage $V_{in}$ of the SMPS 10 may (depending on the time scales over which they occur) be manifested as variations in the output voltage $V_{out}$ of the SMPS 10. To suppress deviations in the output voltage $V_{out}$ caused by input voltage fluctuations, a conventional SMPS typically employs a Voltage Feed-Forward (VFF) mechanism to adjust the control signal D based on the input voltage $V_{in}$. In the example of FIG. 1A, the VFF mechanism comprises a VFF scaling block 60 arranged to scale the control signal D from the controller 40 by a scaling factor that is based on $V_{in}$ to generate a scaled control signal, $D_{scale}$. The VFF mechanism thus allows the feedback loop of the SMPS 10 to respond quickly to changes in $V_{in}$, without relying on the manifestation of these changes in the output of the SMPS 10, thereby allowing the SMPS 10 to suppress transients in the input voltage effectively, with relatively little delay.

The conventional SMPS of FIG. 1A makes use of a periodic reference signal $S_{ref}$ and the scaled duty cycle control signal $D_{scale}$ to generate drive signals $Q_i$ for turning ON and OFF the switching element(s) in its powertrain 50. In the so-called Nyquist-sampled controller, in which the output voltage sampling rate and the SMPS switching frequency $f_{SW}$ are the same, a duty cycle control signal indicative of a duty cycle value is generated during one period of the reference signal $S_{ref}$, using a sample of the output voltage $V_{out}$ obtained during this period, and is then used to control the switching of the switching element(s) in the next period. A conventional SMPS typically uses pulse width modulation (PWM) to generate drive signals for the switching element(s), wherein the duty cycle control signal $D_{scale}$ is compared with the reference signal $S_{ref}$, and the state of the switching element(s) is controlled on the basis of that comparison.

The SMPS may, as in the example of FIG. 1A, employ a digital PWM (DPWM) 70 to drive the switching element(s) based on a comparison between the reference signal $S_{ref}$ and the scaled duty cycle control signal $D_{scale}$. For example, where the SMPS employs dual-edge modulation, the reference signal $S_{ref}$ may, as shown in FIG. 1B, be provided in the form of a triangular waveform. In FIG. 1B, the value, $S_1$, of the scaled duty cycle control signal $S_{scale}$ that is to be used in the period $P_1$ (starting at time $t=T_1$) is generated during the period $P_0$. The DPWM 70 compares $S_{scale}$ with $S_{ref}$ and generates a drive signal, $S_{drive}$, for the switching element(s) based on that comparison. In the example of FIG. 1B, the drive signal $S_{drive}$ is high, and the switching element(s) are consequently turned ON, when $S_{scale}$ exceeds $S_{ref}$.

In the conventional SMPS described above, there is a delay of about one period of the reference signal $S_{ref}$ between the calculation of the duty cycle control signal value and the switching of the switching element(s) in accordance with that value. This delay leads to a phase loss that reduces the performance of the SMPS 10, for example, in terms of load transient response.

Due to the relatively high power consumption and silicon area of fast Analog to Digital Converters (ADC) and fast digital signal processing (DSP) circuits that have been available in the past, SMPS controllers of the conventional type described above have continued to be the industry standard, despite the performance limitations outlined above. However, technological improvements in the field of CMOS processes, which allow high-speed ADC and high-speed DSP to be realised, have opened up the possibility of improving SMPS performance at an affordable cost. More particularly, the so-called multi-rate controllers that have been developed sample the feedback signal (e.g. an error signal indicative of the difference between the output voltage and a reference signal) at a frequency N times higher than the reference signal frequency, and use this oversampled signal together with one or more other signals sampled at lower frequency to switch the switching element(s) multiple times during each period of the reference signal (rather than once, as in the case of the conventional SMPS whose operation is illustrated in FIG. 1B), thereby reducing the aforementioned phase loss.

To achieve a good feedback loop response and avoid oscillations, multi-rate SMPS controllers typically employ a filtering process that attenuates the usual voltage ripple which propagates to the feedback loop from the output of the SMPS. The voltage ripple is a substantially periodic oscillation in the output voltage of the SMPS, which is typically small in relation to the output voltage, and which may occur as a result of an incomplete suppression of an output alternating waveform by the SMPS's output filter. Conventional digital SMPS controllers usually attenuate the ripple component by oversampling the output voltage of the SMPS (or the error signal, as the case may be) and manipulating the oversampled signal using an appropriately configured Finite Impulse Response (FIR) or Infinite Impulse Response (IIR) filter, e.g. a moving average filter or a decimation filter. Such filtering processes cause the voltage ripple component of the oversampled signal to be suppressed, thus allowing the low-bandwidth signal (i.e. voltage deviations due to transients) to be obtained for use in output voltage regulation.

SUMMARY

The present inventors have recognised that the conventional feedback loop designs used to adjust the frequency or duty cycle of the switching elements outlined above have the disadvantage of introducing a delay in the signal, which degrades the performance of the feedback loop. More particularly, the conventional VFF mechanism discussed above was found to introduce a phase lag and to distort the signal in the time domain, making real-time control of the SMPS's output voltage difficult or impossible. The present inventors have found that this increased latency is particularly noticeable when the conventional VFF mechanism is employed in a multi-rate controller, and have furthermore found that significant improvements in performance can be achieved by modifying the conventional VFF mechanism to oversample the input voltage and generate a feed-forward signal to be combined with the feedback control signal from the controller to generate the duty cycle control signal for controlling the switching of the SMPS.

More specifically, the inventors have devised a controller arranged to generate a duty cycle control signal for controlling an output voltage of an SMPS, the SMPS being arranged to control its switching based on the duty cycle control signal and an oscillatory reference signal. The controller comprises a first sampling module arranged to sample a signal indicative of the output voltage of the SMPS at a first frequency that is higher than a frequency of the reference signal to generate a first sampled signal, and a filter module arranged to filter out a ripple component of the first sampled signal to generate a filtered signal. The controller further comprises a feedback control signal generator arranged to generate, based on the filtered signal, at least one feedback control signal for controlling the output voltage of the SMPS. The controller also has a second sampling module arranged to sample a signal indicative of an input voltage of the SMPS at a second frequency that is higher than the frequency of the reference signal to generate a second sampled signal, and a feed-forward control signal generator arranged to generate, based on the second sampled signal and a reference voltage, a feed-forward control signal for controlling the output voltage of the SMPS. The controller further comprises a combining module arranged to generate the duty cycle control signal based on the at least one feedback control signal and the feed-forward control signal.

The inventors have further devised a switched mode power supply comprising a controller as set out above.

The inventors have further devised a method of generating a duty cycle control signal for controlling an output voltage of an SMPS, the SMPS being arranged to control its switching based on the duty cycle control signal and an oscillatory reference signal. The method comprises: sampling a signal indicative of the output voltage of the SMPS at a frequency higher than a frequency of the reference signal to generate a first sampled signal; filtering out a ripple component of the first sampled signal to generate a filtered signal; generating, based on the filtered signal, at least one feedback control signal for controlling the output voltage of the SMPS; sampling a signal indicative of an input voltage of the SMPS at a second frequency which is higher than the frequency of the reference signal to generate a second sampled signal; generating, based on the second sampled signal and a reference voltage, a feed-forward control signal for controlling the output voltage of the SMPS; and generating the duty cycle control signal based on the at least one feedback control signal and the feed-forward control signal.

The inventors have further devised a computer program product, comprising a signal or a non-transitory computer-readable storage medium carrying computer program instructions which, when executed by a processor, cause the processor to perform a method as set out above.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Embodiment 1

Figure 1A:
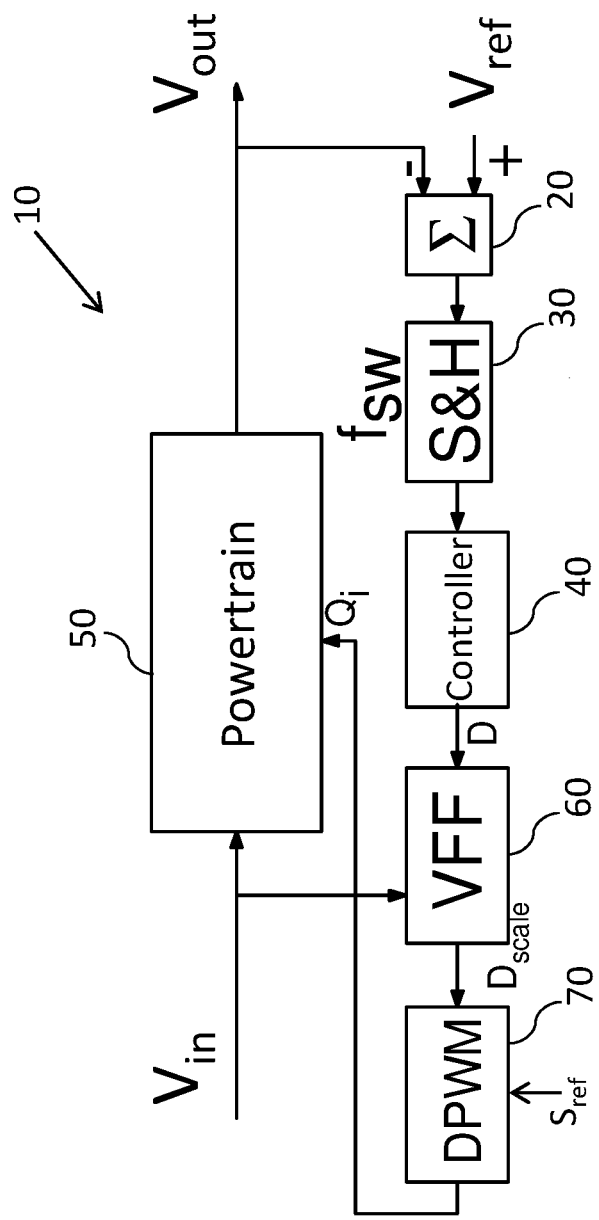
FIG. 1A illustrates functional components of a conventional switched mode power supply.
Figure 1B:
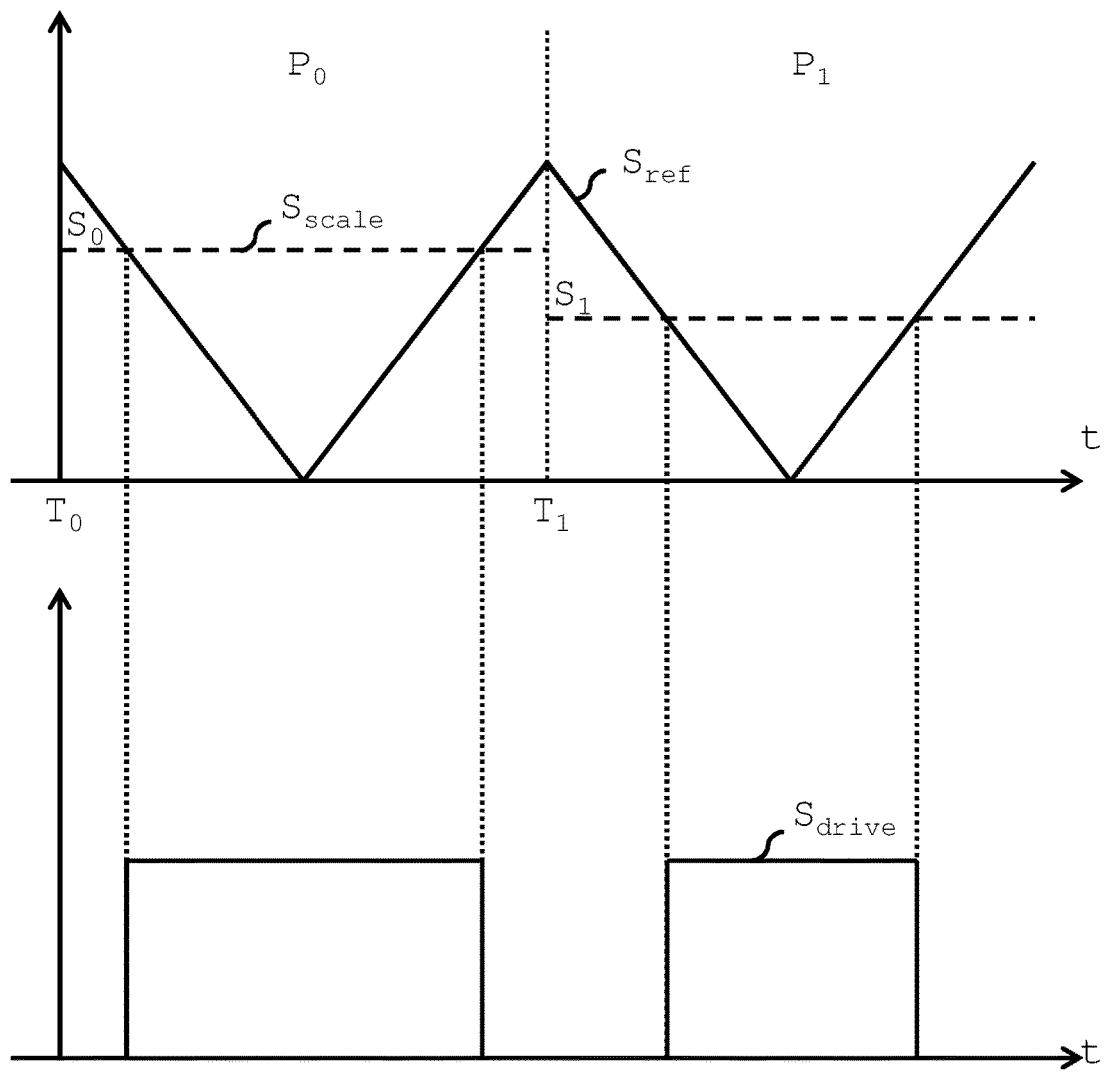
FIG. 1B illustrates signals used by the DPWM of the conventional SMPS shown in FIG. 1A to control the switching of the SMPS.
Figure 2:
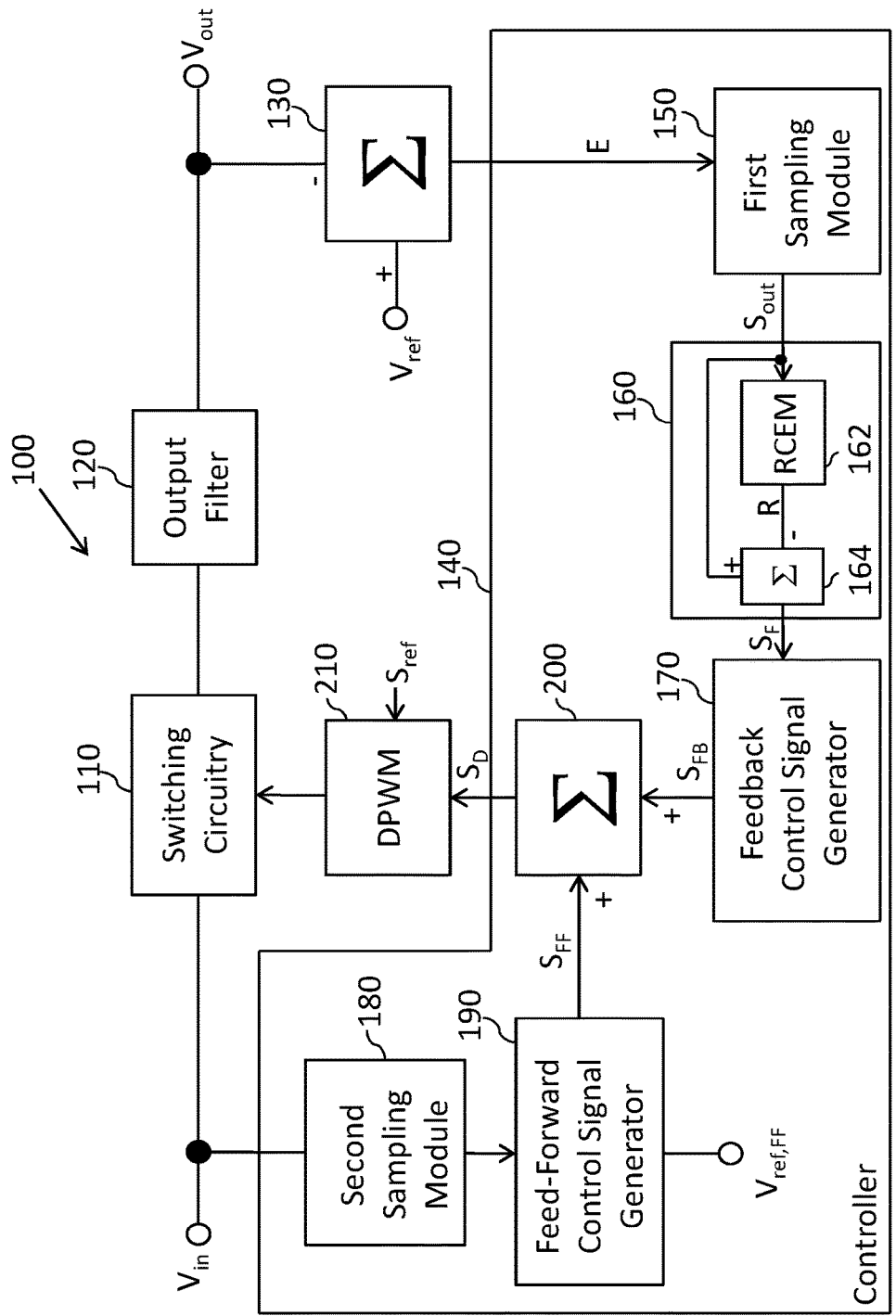
FIG. 2 illustrates functional components of a switched mode power supply according to a first embodiment of the present invention.

FIG. 2 is a schematic showing an SMPS 100 according to an embodiment of the present invention.

In the present embodiment, the SMPS 100 comprises switch circuitry 110 having at least one switching element (e.g. MOSFET) that is arranged in the switch circuitry 110 and controlled to switch at a high frequency (e.g. tens to hundreds of kHz) and with a duty cycle so as to convert an input DC voltage $V_{in}$ of the SMPS 100 to an output voltage $V_{out}$, which is filtered by a low-pass filter 120 of the SMPS (e.g. a first order LC filter comprising an inductor and one or more capacitors) to generate an output DC voltage, $V_{out}$, of the SMPS 100. The switch circuitry 110 may, as in the present embodiment, include an isolation transformer having a primary winding driven by a primary side circuit, and a secondary winding electromagnetically coupled to the primary winding and arranged to drive a secondary side circuit typically comprising a rectifying network, the one or more switching elements being provided in one or both of the primary and secondary side circuits. Suitable circuit topologies (e.g. buck, boost, isolated or not) and other details of the switch circuitry 110 (e.g. whether it is configured to be soft-switched or hard-switched), as well as details of the output filter 120, are well-known to those skilled in the art and will therefore not be described here.

The SMPS 100 further comprises a feedback loop which is arranged to regulate the output voltage $V_{out}$ of the SMPS 100 in accordance with an appropriately selected control law. The feedback loop may, an in the present embodiment, employ a PID controller that is characterised by a set of Proportional, Integral and Derivative values (hereafter abbreviated to P, I and D values, respectively). However, as will be explained in the following, the PID controller of the present embodiment is of a parallel form and may be adjusted, by effectively turning off one or two of the parallel signal paths by appropriate setting of the P, I and D values, to function as a P, PD or a PI controller. The feedback loop operates on the basis of a signal that is indicative of the output voltage $V_{out}$ of the SMPS. This signal may, for example, be the output voltage $V_{out}$ itself or an error signal E obtained by subtracting one of $V_{out}$ and a reference voltage $V_{ref}$ from the other of $V_{out}$ and $V_{ref}$. In the present embodiment, the feedback loop comprises a subtraction module 130 that is configured to subtract $V_{out}$ from $V_{ref}$ and communicate the resulting error signal E to the SMPS controller 140 as an example of a signal that is indicative of $V_{out}$.

The SMPS 100 also has a feed-forward loop that plays a part in the regulation of the output voltage $V_{out}$ of the SMPS 100, on the basis of a signal that is indicative of the input voltage $V_{in}$ of the SMPS 100. In the present embodiment, the signal indicative of the input voltage $V_{in}$ of the SMPS 100 is the input voltage itself, which is provided as another input to the controller 140. However, in other embodiments, this signal may be the inverse of the input voltage $1/V_{in}$, a scaled value of $V_{in}$ or a scaled value of $1/V_{in}$, for example.

In more detail, the SMPS controller 140 comprises a first sampling module 150 that is arranged to sample the error signal E at a first frequency higher than a frequency of an oscillatory reference signal, $S_{ref}$, which is used by the SMPS 100 to control its switching, and to temporarily store the sampled values. The first sampling module 150 is arranged to output the sample values it acquires as a first sampled signal, $S_{out}$. The first sampling module 150 may, as in the present embodiment, oversample the error signal E by an integer factor N=16. Naturally, the oversampling factor N is not limited to 16 and may take any other integer value selected by the user. In embodiments where N is an integer and the operation of the first sampling module 150 is synchronised with the reference signal $S_{ref}$, N samples of the error signal E are obtained in each period T of the reference signal $S_{ref}$, with the $i^{th}$ sample in each period being spaced apart from the $i^{th}$ sample in the next (or previous) period by the period T of the reference signal $S_{ref}$, and with each of these samples having been obtained at the same time relative to the start of the respective period. Thus, the first sampling module 150 can be considered to sample and hold N sets of corresponding samples of the error signal E, with the sample acquisition times of the samples in each set being spaced apart from one another by the period T. The number of samples in each of these sets may also be selected by the user, and can be considered to define a (moving) time window within which corresponding samples are averaged, as explained further below.

To achieve a good feedback loop response and avoid oscillations, the controller 140 also includes a filter module, which is arranged to at least partially remove the usual voltage ripple that propagates to the feedback loop from the output of the SMPS, specifically to filter out at least one ripple component of the first sampled signal $S_{out}$ to generate a filtered signal $S_F$.

The filter module may attenuate the ripple by oversampling the error signal E and manipulating the oversampled signal using an appropriately configured Finite Impulse Response (FIR) or Infinite Impulse Response (IIR) filter, e.g. a moving average filter or a decimation filter. Such filtering processes cause the voltage ripple in the oversampled signal to be suppressed, thus allowing the remaining signal (i.e. voltage deviations due to transients) to be obtained for use in output voltage regulation.

The present inventors have recognised that the filter designs mentioned above have the disadvantage of introducing a delay in the signal, which degrades the performance of the feedback loop. More particularly, these filter designs introduce a phase lag and distort the shape of the signal in the time domain, making real-time control of the SMPS's output voltage difficult or impossible.

Figure 3:
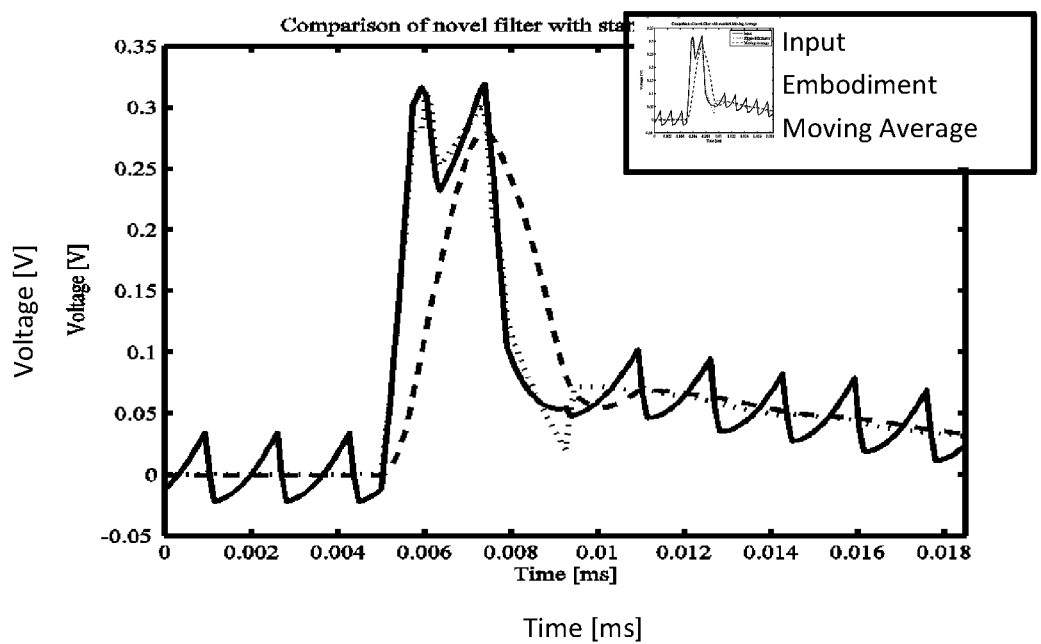
FIG. 3 shows measurements of a feedback error signal (solid line) during a period of time in which a voltage transient is observed, together with measurements of the output of a conventional moving average filter (dashed line), and of the output of a filter module (dotted line) of the first embodiment.

As an example, FIG. 3 shows the output of a conventional moving average filter (dashed line) that is arranged to filter the error signal E (solid line). In this example, the moving average filter operates over 16 samples, which is the same as the number of samples in the period of the reference signal $S_{ref}$ (an oversampling ratio of 16 is used). As can be appreciated from FIG. 3, although the moving average filter is effective in suppressing the ripple, it causes the signal to be delayed and distorted during a transient event (beginning at time t=0.005 ms).

Having recognised these drawbacks, the present inventors have devised a scheme for filtering the sampled feedback signal, $S_{out}$, which exploits the reproducibility (or near-reproducibility) of the ripple over a number of periods of the reference signal $S_{ref}$ during stable operation of the SMPS to obtain a good estimate of the prevailing ripple component. This estimate of the ripple component is subtracted from $S_{out}$ to yield the remaining signal, which exhibits little or no delay or distortion. The ability of an embodiment of the present invention to effectively suppress the ripple component whilst leaving the remainder of the feedback signal substantially unchanged is illustrated by the dotted line in FIG. 3. The delay/distortion is considerably smaller than in the case where a conventional moving average filter is used.

More specifically, in an embodiment of the present invention, the filter module 160 may comprise a ripple component estimation module (RCEM) 162 that is arranged to estimate the ripple component R by calculating, for each or some of the samples in the first sampled signal Sout that have been received from the first sampling module 150, an average sample value (e.g. a mean or a weighted average) using the sample value itself and sample values obtained at corresponding points in preceding periods of the reference signal $S_{ref}$, each of said corresponding points being separated from the sample by a respective integer number of periods of the reference signal $S_{ref}$. The corresponding points may alternatively be separated from said sample by a respective interval whose length is substantially equal to (i.e. within a tolerance band, such as 2%, 5% or 10%, of) said respective integer number of periods. In the present embodiment, the ripple component estimation module 162 is arranged to calculate a weighted average of the sample values (including the sample value itself) in the time window for each of the aforementioned N sets of samples. In this way, the ripple component estimation module 162 is able to obtain a good estimate of what the ripple component R should be at any point in time, by exploiting the reproducibility of the ripple from one period of the reference signal $S_{ref}$ to the next during stable operation of the SMPS 100 (when no transients appear). The averaging process suppresses the influence of outlying sample values on the mean sample value, thereby allowing the ripple component R to be estimated with relatively high accuracy.

Figure 4:
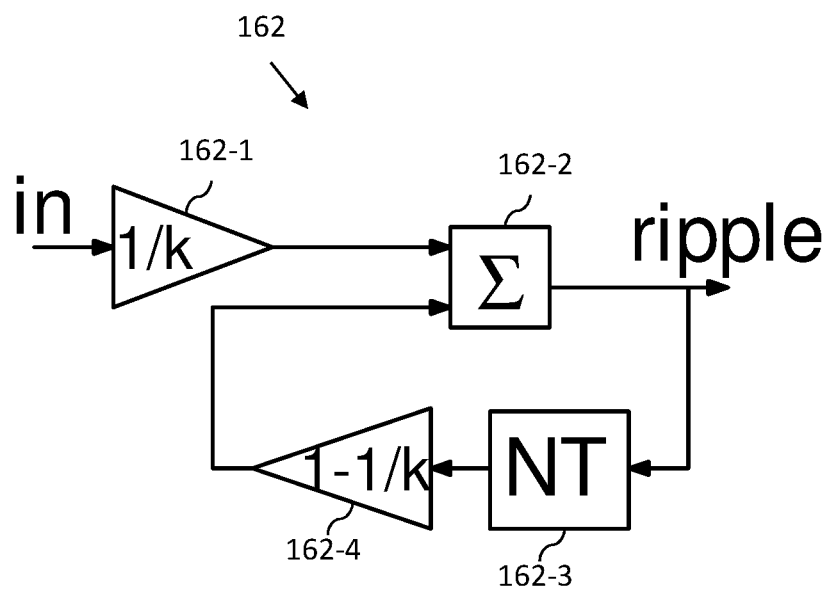
FIG. 4 shows an example implementation of the ripple component estimation module illustrated in FIG. 2.

In the present embodiment, the ripple component estimation module 162 is arranged to estimate the ripple component R using an interpolated low-pass filter in the exemplary form of a first-order interpolated recursive moving average filter, as illustrated in FIG. 4. The factor k shown in FIG. 4 is approximately equal to the number of periods of the reference signal $S_{ref}$ which are considered in the calculation of the average.

The interpolated recursive moving average filter in the example of FIG. 4 comprises a first scaling module 162-1 arranged to receive sample values in the first sampled signal $S_{out}$ and scale each of the received sample values by a factor 1/k, and a summing module 162-2 arranged to add each of the scaled sample values to a respective sum of scaled sample values to generate a respective addition result. As shown in FIG. 4, the interpolated recursive moving average filter further comprises a feedback loop that processes the output of the summing module 162-2 and feeds the processing results back to an input of the summing module 162-2. In more detail, the feedback loop comprises a delay module 162-3 (e.g. in the form of a First In, First Out (FIFO) buffer) which is arranged to receive the addition results in the order in which the addition results are generated by the summing module 162-2, to store N of the received addition results at any one time, and to output a stored addition result in response to an addition result being received by the delay module 162-3 so that the stored addition results are output in the same order as they were received by the delay module 162-3. The feedback loop also includes a second scaling module 162-4, which is arranged to receive the addition results from the delay module 162-3 in the order in which they are output by the delay module 162-3, and to scale each received addition result by a factor 1-1/k in order to generate the respective sum of scaled sample values that is to be added to the respective scaled sample value by the summing module 162-2.

The transfer function from the input, in(z) to the output of the filter in FIG. 4, ripple(z) is given by $$\text{ripple}(z) = \frac{1/k}{1-(1-1/k)z^{-N}} \text{in}(z). \qquad \text{Eqn. 1}$$

Referring again to FIG. 2, the filter module 160 of the present embodiment also includes a subtraction module 164 arranged to subtract the estimated ripple component R from the first sampled signal $S_{out}$ to generate a filtered signal, $S_F$. In the present embodiment, the controller 140 is arranged to generate a duty cycle control signal $S_D$ for controlling the switching duty cycle of the SMPS 100 using the filtered signal $S_F$.

Using Eqn. 1, the transfer function for the $S_F(z)$ signal in FIG. 2 can be expressed as follows:

$$S_F(z) = 1 - \text{ripple}(z) = \left[1 - \frac{1/k}{1-(1-1/k)z^{-N}}\right]\text{in}(z) = \qquad \text{Eqn. 2}$$
$$\frac{(1-1/k)[1-z^{-N}]^{10}}{1-(1-1/k)z^{-N}}\text{in}(z)$$

Equation 2 can be used as a variant for calculating the transient signal. However, this variant would require twice the memory, and the ripple component would not be calculated explicitly.

In other embodiments, the ripple component estimation module 162 may be arranged to estimate the ripple component R using a first-order interpolated low-pass filter in the alternative form of an interpolated Finite Impulse Response (FIR) filter (e.g. an interpolated moving average filter). Higher-order interpolated low-pass filters may alternatively be used, as will be discussed further below.

The feedback control signal generator 170 forming part of the controller 140 is arranged to generate at least one feedback control signal $S_{FB}$ for controlling the output voltage $V_{out}$ of the SMPS 100, on the basis of the filtered signal $S_F$ from the filter module 160 and in accordance with a suitable control law, as explained in more detail below.

The feed-forward loop comprises a second sampling module 180, which is arranged to sample the input voltage $V_{in}$ of the SMPS 100 at a second frequency which is higher than the frequency of the oscillatory reference signal $S_{ref}$, and to temporarily store and subsequently output the sampled values, thereby generating a second sampled signal $S_{in}$. In general, the second sampling frequency of the second sampling module 180 may be higher or lower than the first sampling frequency of the first sampling module 150. However, in the present embodiment, these two sampling frequencies are the same, so that the second sampling module 180 also oversamples its input signal (i.e. the input voltage $V_{in}$) by a factor of 16. Naturally, the oversampling factor of the second sampling module, M, is not limited to 16 and may take any other integer value selected by the user. In some embodiments, the oversampling factor M may be greater than (or smaller than) the oversampling factor N.

In embodiments where M is an integer and the operation of the second sampling module 180 is synchronised with the reference signal $S_{ref}$, M samples of the input voltage $V_{in}$ of the SMPS 100 are obtained in each period T of the reference signal $S_{ref}$, with the $i^{th}$ sample in each period being spaced apart from the $i^{th}$ sample in the next (or previous) period by the period T of the reference signal $S_{ref}$, and with each of these samples having been obtained at the same time relative to the start of the respective period. Thus, the second sampling module 180 can be considered to sample and hold M sets of corresponding samples of the input voltage $V_{in}$ of the SMPS 100, with the sample acquisition times of the samples in each set being spaced apart from one another by the period T. The number of samples in each of these sets may also be selected by the user.

The feed-forward loop also has a feed-forward control signal generator 190, which is arranged to generate a feed-forward control signal, $S_{FF}$, for controlling the output voltage $V_{out}$ of the SMPS 100. More specifically, the feed-forward control signal generator 190 is arranged to generate the feed-forward control signal $S_{FF}$ based on the second sampled signal $S_{in}$ and a reference voltage $V_{ref,FF}$. The reference voltage may, as in the present embodiment, be the same as the reference voltage $V_{ref}$ used to obtain the error signal E in the feedback loop (accordingly, in the present embodiment, the reference sign $V_{ref}$ will be used in reference to both reference voltages). The use of a common reference voltage in the feed-forward and feedback loops allows exact or almost exact feed-forward cancellation to be obtained. Alternatively, the reference voltage $V_{ref,FF}$ may be different to $V_{ref}$ for example a value indicative of the maximum expected output voltage of the SMPS, or a value indicative of the minimum expected output voltage of the SMPS 100.

In the present embodiment, the SMPS 100 is a buck converter, and the feed-forward control signal generator 190 is arranged to output calculated values of the ratio $V_{ref}/S_{in}$ as the feed-forward control signal $S_{FF}$. On the other hand, in alternative embodiments where the SMPS 100 is of the boost or buck-boost topology, for example, the feed-forward control signal generator 190 is arranged to output, as the feed-forward control signal $S_{FF}$, calculated values of the ratio $1-S_{in}/V_{ref}$ and $[1-S_{in}/V_{ref}]^{-1}$, respectively. Appropriate forms of $S_{FF}$ may be selected for other SMPS topologies by those skilled in the art. In order to avoid the complexity of the division operation, the feed-forward control signal generator 190 may use a look-up table, for example, or the technique described in U.S. Pat. No. 8,816,663 B2.

The controller 140 further comprises a combining module 200 arranged to generate the duty cycle control signal $S_D$ for controlling the output voltage $V_{out}$ of the SMPS 100, on the basis of the one or more feedback control signals $S_{FB}$ generated by the feedback control signal generator 170 and the feed-forward control signal $S_{FF}$ generated by the feed-forward control signal generator 190. More specifically, the combining module 200 of the present embodiment is arranged to generate $S_D$ by summing $S_{FF}$ and $S_{FB}$.

In the present embodiment, the feedback control signal generator 170 is a PID controller 170 (also referred to as a PID regulator), which regulates the duty cycle of the switching element(s) of the SMPS 100 in accordance with a PID control law that is characterised by the values of the P, I and D control parameters set in the PID controller 170. The controller 140 is arranged to generate the duty cycle control signal $S_D$ (indicative of the required switching duty cycle) to control a digital pulse width modulator (DPWM) 210, which is also included in the control loop, in order to appropriately control the switching of the switching element(s). The DPWM 210 controls the switching of the switching element(s) in the switch circuitry 110 based on the duty cycle control signal $S_D$ and the aforementioned oscillatory reference signal, $S_{ref}$. The DPWM 210 can be of any suitable type and use any suitable form of modulation, e.g. leading-edge, trailing-edge or dual-edge modulation. Of these alternatives, dual-edge modulation yields the best result as it gives the least phase delay, and is therefore employed in the present embodiment.

Figure 5:
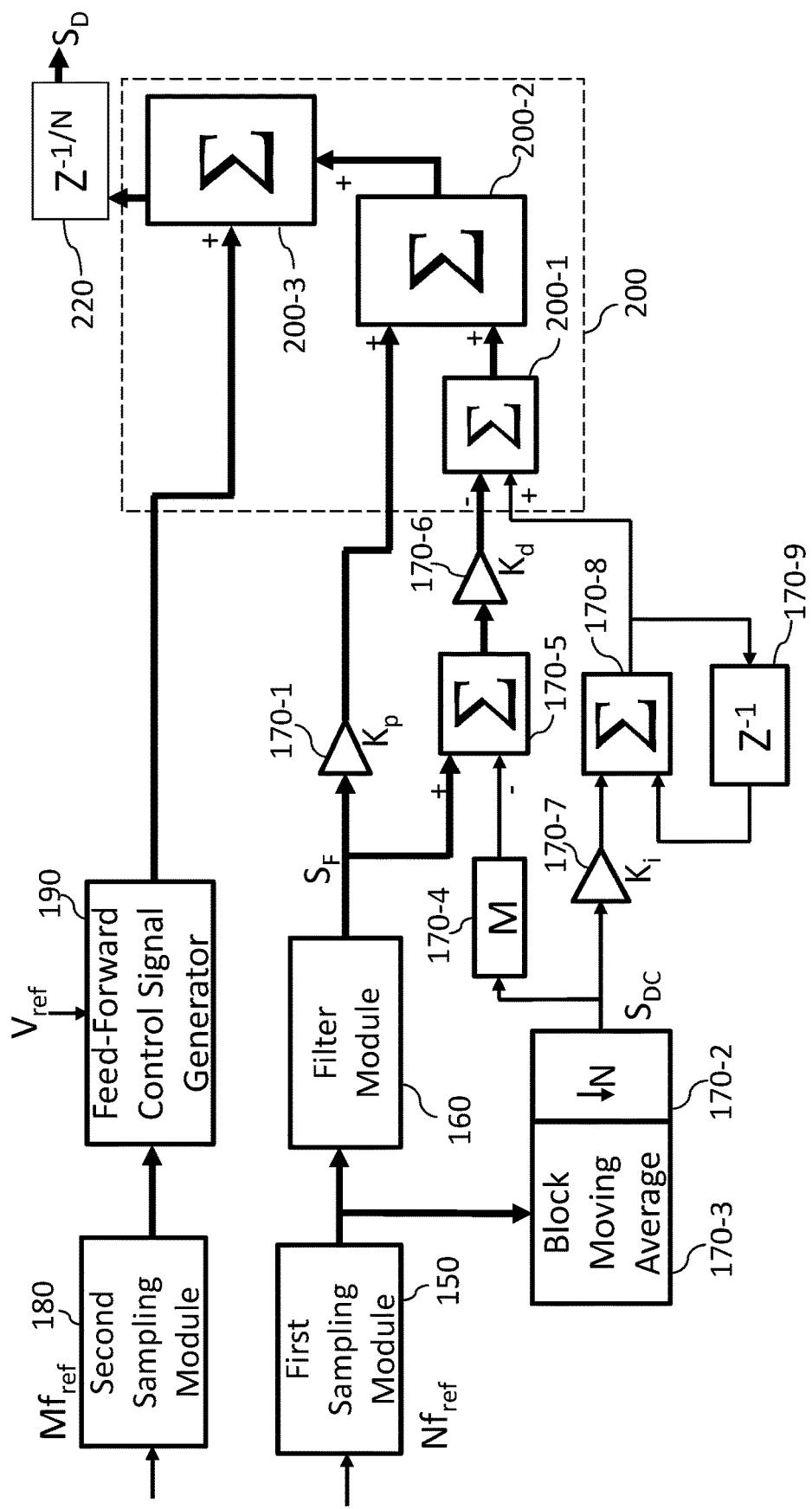
FIG. 5 is a schematic showing further details of the controller 140 of the first embodiment.

FIG. 5 shows the configuration of the controller 140 of the present embodiment, comprising the first sampling module 150, the filter module 160, the feedback control signal generator 170, the second sampling module 180, the feed-forward control signal generator 190 and the combining module 200. As shown in FIG. 5, the PID controller 170 of the present embodiment comprises three components, in other words, three signal processing "branches"; namely, a first component (also referred to herein as a "Proportional component", which can be identified with the proportional (P) part of the PID controller), a second component (also referred to herein as a "Derivative component", which can be identified with the derivative (D) part of the PID controller) and a third component (also referred to herein as a "Integral component", which can be identified with the integral (I) part of the PID controller).

The Proportional component is arranged to scale sample values of the filtered signal $S_F$ output by the filter module 160 by a first scaling factor, $K_p$, to generate a first feedback control signal (also referred to herein as a "Proportional component signal"). The first component may, as in the present embodiment, comprise a scaling module 170-1 that is arranged to scale the filtered signal $S_F$ by the factor $K_p$.

The PID controller 170 also has a down-sampling (or "decimation") module 170-2 which is arranged to generate a down-sampled signal $S_{DC}$ by sampling, at the frequency $f_{ref}$ of the reference signal $S_{ref}$, a signal which is based on the first sampled signal $S_{out}$ from the first sampling module 150. The signal sampled by the down-sampling module 170-2 may be the signal as output by the first sampling module 150 or, as in the present embodiment, a signal obtained by processing the signal output of the first sampling module 150 by a block moving average filter 170-3. The block moving average filter 170-3 is arranged to calculate a respective average of samples obtained by the first sampling module 150 in each period T of the reference signal $S_{ref}$. The down-sampling module 170-2 is arranged to generate the down-sampled signal $S_{DC}$ by sampling, at the frequency $f_{ref}$ of the reference signal, the moving average calculated by the moving average filter 170-3. In the present embodiment, the block moving average filter 170-3 is provided because the filter module 160 of the present embodiment does not correctly calculate the DC-level within each period of the reference signal $S_{ref}$. The block moving average filter 170-3 computes the DC-level separately, by calculating the average of the N samples within each period. Hence, the result from that block has a correct result of the DC level every N samples, and this is why the down-sampling module 170-2 with a factor N is connected adjacent to it.

Figure 6:
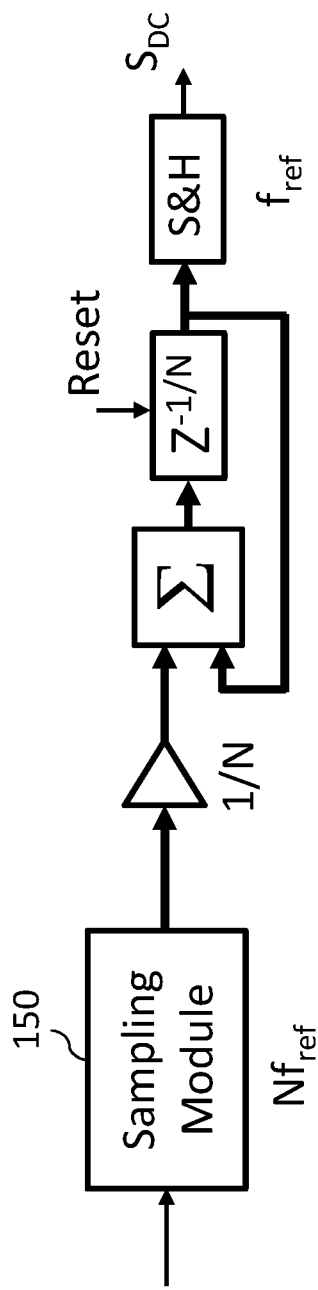
FIG. 6 shows an example implementation of the block moving average filter 170-3 and down-sampling module 170-2 illustrated in FIG. 5.

A simple implementation of a block moving average calculation and down-sampling process is illustrated in FIG. 6. The error signal E oversampled by a factor of N is multiplied by a factor 1/N. If N is chosen as a power of 2, the multiplication is easily accomplished by a shift of $\log_2(N)$ bits. The multiplied values are accumulated in the accumulator ($z^{-1/N}$). At the start of each new block, the accumulator value is sampled and held at the output for the next period T and, at the same time, the accumulator register is reset. The next block can then start to be calculated. Hence, one output sample is calculated in each period of the reference signal $S_{ref}$.

Referring again to FIG. 5, the PID controller 170 further comprises a storage module 170-4, which is arranged to store a value of the down-sampled signal output by the down-sampling module 170-2. Thus, the combination of the block moving average 170-3 and the down-sampling module 170-2 outputs, once every period of the reference signal $S_{ref}$, an average value of the samples obtained by the first sampling module 150 in the preceding period, and this value is stored in the storage module 170-4, in place of the value previously stored in the storage module 170-4.

The Derivative component of the PID controller 170 is arranged to generate a second (Derivative) feedback control signal by calculating values of a product of a second scaling factor, $K_d$, and a difference signal, the Derivative component being arranged to calculate the difference signal by calculating the difference between each sample value of the filtered signal $S_F$ and the value of the down-sampled signal $S_{DC}$ stored in the storage module 170-4. The PID controller 170 is arranged such that each value of the difference signal represents the difference between a respective value of the filtered signal $S_F$ (that is itself based on a respective one or more samples obtained by the first sampling module 150 during a period of the reference signal $S_{ref}$) and a value of the down-sampled signal $S_{DC}$ that is based on at least one sample obtained by the first sampling module 150 in the previous period of the reference signal $S_{ref}$.

The Derivative component may, as in the present embodiment, comprise a difference calculating module 170-5 that is arranged to calculate, for each sample of the filtered signal $S_F$ that is derived from a sample obtained by the first sampling module 150 during a period of the reference signal $S_{ref}$, the difference between that sample value and the value stored in the storage module 170-4, the stored value being based on samples obtained by the first sampling module 150 in the previous period of the reference signal $S_{ref}$. The output of the difference calculating module 170-5 is scaled by a second scaling module 170-6, specifically by the second scaling factor, $K_d$. It will be appreciated that the scaling by the factor $K_d$ may alternatively be applied to the inputs of the difference calculating module 170-5, rather than to the difference signal which it generates.

The Integral component of the PID controller 170 is arranged to scale the down-sampled signal $S_{DC}$ by a third scaling factor, $K_i$, and to accumulate values of the scaled, down-sampled signal to generate a third (Integral) feedback control signal. The Integral component may, as in the present embodiment, comprise a scaling module 170-7 for scaling the values of $S_{DC}$ by $K_i$, and a summing module 170-8 arranged to add each of the values of the scaled, down-sampled signal to a respective sum of values of the scaled, down-sampled signal to generate a respective addition result. As shown in FIG. 5, the Integral component further comprises a feedback loop that processes the output of the summing module 170-8 and feeds the processing results back to an input of the summing module 170-8. In more detail, the feedback loop comprises a delay module 170-9 (e.g. in the form of a First In, First Out (FIFO) buffer) which is arranged to receive the addition results in the order in which the addition results are generated by the summing module 170-8, to store one received addition result at any one time, and to output a stored addition result in response to an addition result being received by the delay module 170-9 so that the stored addition results are output in the same order as they were received by the delay module 170-9. In steady state, the accumulated value in the delay module 170-9 will correspond to losses in the powertrain, and an appropriate duty cycle may be calculated by the feed-forward signal generator 190. It will be appreciated that the scaling by the factor $K_i$ may alternatively be applied at the output of (instead of before) the feedback loop, at a point in the signal processing path between the feedback loop and the combining module 200.

The combining module 200 may, as in the present embodiment, be arranged to generate the duty cycle control signal $S_D$ by combining the feed-forward control signal $S_{FF}$ with the Proportional, Derivative and Integral feedback control signals in a sequence of combining (addition or subtraction) operations, in accordance with a prioritisation of the control signals by the user. Each of the combining operations may comprise one of: i) combining one of the control signals with another of the control signals; ii) combining one of the control signals with a combination of other of the control signals; and iii) combining a combination of some of the control signals with a combination of other of the control signals.

By way of example, in the present embodiment, the user requires the feed-forward control signal $S_{FF}$ to be processed by the controller 140 with the minimum delay (i.e. highest priority), the Proportional feedback control signal with the next lowest delay (i.e. next highest priority), and the remaining two feedback control signals with the lowest priority. These prioritisations may be input to the combining module 200 by the user by any suitable means. In response to receiving this prioritisation information, the combining module 200 is arranged to configure itself to combine the feed-forward control signal $S_{FF}$ with the feedback control signals $S_{FB}$ so that control signals are introduced into the sequence of combining operations in an order that is based on the received prioritisation of the control signals by the user. Thus, in the present embodiment, the combining module 200 is arranged to subtract the Derivative feedback control signal from the Integral feedback control signal in a first combining operation that is performed by subtraction module 200-1. The combining module 200 then combines, in a second combining operation that is performed by the addition module 200-2, the Proportional feedback control signal to the combination of the Derivative and Integral feedback control signals output by the subtraction module 200-1. Finally, the addition module 200-3 combines the feed-forward control signal $S_{FF}$ with the output of addition module 200-2 to generate the duty cycle control signal $S_D$.

Thus, the control signal SFF is processed with the delay associated with one combining operation, the Proportional feedback control signal is processed with the delay associated with two combining operations, and the remaining two signals are each processed with the delay associated with three combining operations, thus reflecting the user's prioritisation. The combining module 200 may determine an arrangement of combining modules in accordance with the user's prioritisation by any suitable means, for example a look-up table that associates a configuration of combining modules with a corresponding signal prioritisation.

In other embodiments where the feedback control signal generator 170 generates two or more feedback control signals, the user may require all of these feedback control signals and the feed-forward control signal to have equal priority. In such embodiments, the combining module 200 may be arranged to combine the control signals pair-wise in two separate and concurrently performed addition operations in order to obtain two partial sums of two control signals, and to then add the partial sums together to generate the duty cycle control signal $S_D$. Thus, each of the control signals is processed with the delay associated with the performance of two combining operations.

In embodiments like the present, where the delay introduced by the signal processing operations that are performed by the feed-forward loop, the feedback loop and the combining module 200 is small, the combination calculated by the combining module 200 may be stored in a delay module 220 which is similar to the delay module 170-9 but provides a delay of $1/Nf_{ref}$ (rather than $T=1/f_{ref}$ as in the case of delay module 170-9). In embodiments where the second sampling frequency of the second sampling module 180 is greater than the first sampling frequency of the first sampling module 150, however, the delay module 220 preferably provides a delay of $1/Mf_{ref}$ instead. All of these cases contrast with conventional Nyquist-sampled PID controllers, in which the calculated value that is indicative of the required switching duty cycle is stored for a period T before being used by the DPWM to adjust the duty cycle.

It will be appreciated from the foregoing that the PID controller 170 of the present embodiment is a multi-rate controller having slow and fast signal processing paths. More particularly, the error signal E is sampled N times faster than $f_{ref}$, and the PID controller 170 has a fast processing path (illustrated by the thicker lines in FIG. 5) for the P- and D-part calculations, which updates the duty cycle output N times within each period of the reference signal $S_{ref}$, and a slow signal processing path (illustrated by the thinner lines in FIG. 5), corresponding to the Integral component which updates the value that is input to the subtraction module 200-1 and to the delay module 170-9 once every period of the reference signal $S_{ref}$.

Furthermore, the controller of the present embodiment oversamples both the input voltage $V_{in}$ and the output voltage $V_{out}$ of the SMPS 100, and operates with a reduced delay in both the feed-forward loop and the feedback loop. The controller can thus mimic the behaviour of an analog controller that has minimum delay and continually updates the duty cycle control signal to the PWM for both the feedback loop and the input voltage feed-forward loop.

The parallel form of the PID controller 170 of the present embodiment allows one or two signal processing paths to be effectively disabled by appropriate choice of P, I and D values, enabling the controller 170 to be easily configured to function not only as a PID controller but alternatively as a P controller, a PI controller or PD controller. For example, a PD controller with a constant offset (from the integrator) can be obtained by setting $K_i=0$. In this case, a higher gain can be used since the phase lag from the integrator component is not present. This adjustability could be exploited in gain scheduling. For example, in response to a transient, the integrator path could be turned off and the transient handled by a fast PD controller. After the transient has passed, the integrator could be turned back ON to remove the remaining steady-state error. As another example, in a noisy environment, the derivative component could be turned OFF to provide a PI regulator having a low gain at high frequencies.

Figure 7:
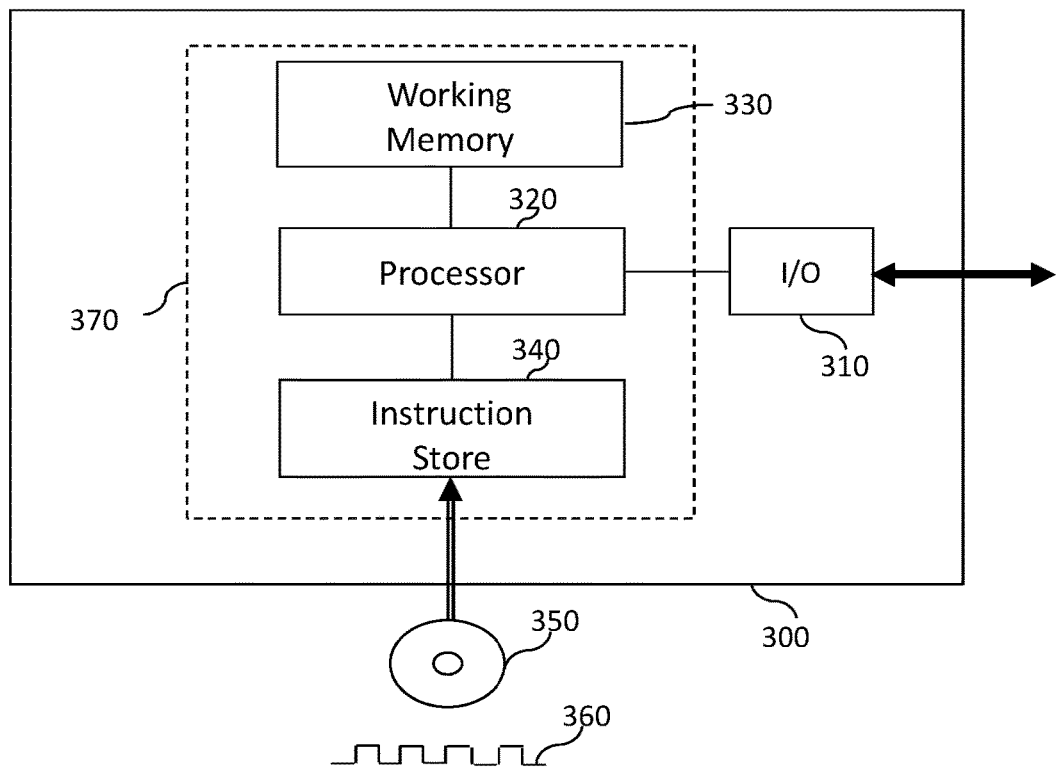
FIG. 7 shows an exemplary hardware implementation of the controller shown in FIG. 2.

FIG. 7 shows an exemplary implementation of the controller 140, in programmable signal processing hardware. The signal processing apparatus 300 shown in FIG. 7 comprises an input/output (I/O) section 310 for receiving the error signal E and signal indicative of the input voltage $V_{in}$ of the SMPS 100, and transmitting control signals $S_D$ to the DPWM 210. The signal processing apparatus 300 further comprises a processor 320, a working memory 330 and an instruction store 340 storing computer-readable instructions which, when executed by the processor 320, cause the processor 320 to perform the processing operations hereinafter described to control the output voltage of the SMPS 100. The instruction store 340 may comprise a ROM which is pre-loaded with the computer-readable instructions. Alternatively, the instruction store 340 may comprise a RAM or similar type of memory, and the computer readable instructions can be input thereto from a computer program product, such as a computer-readable storage medium 350 such as a CD-ROM, etc. or a computer-readable signal 360 carrying the computer-readable instructions.

Figure 8:
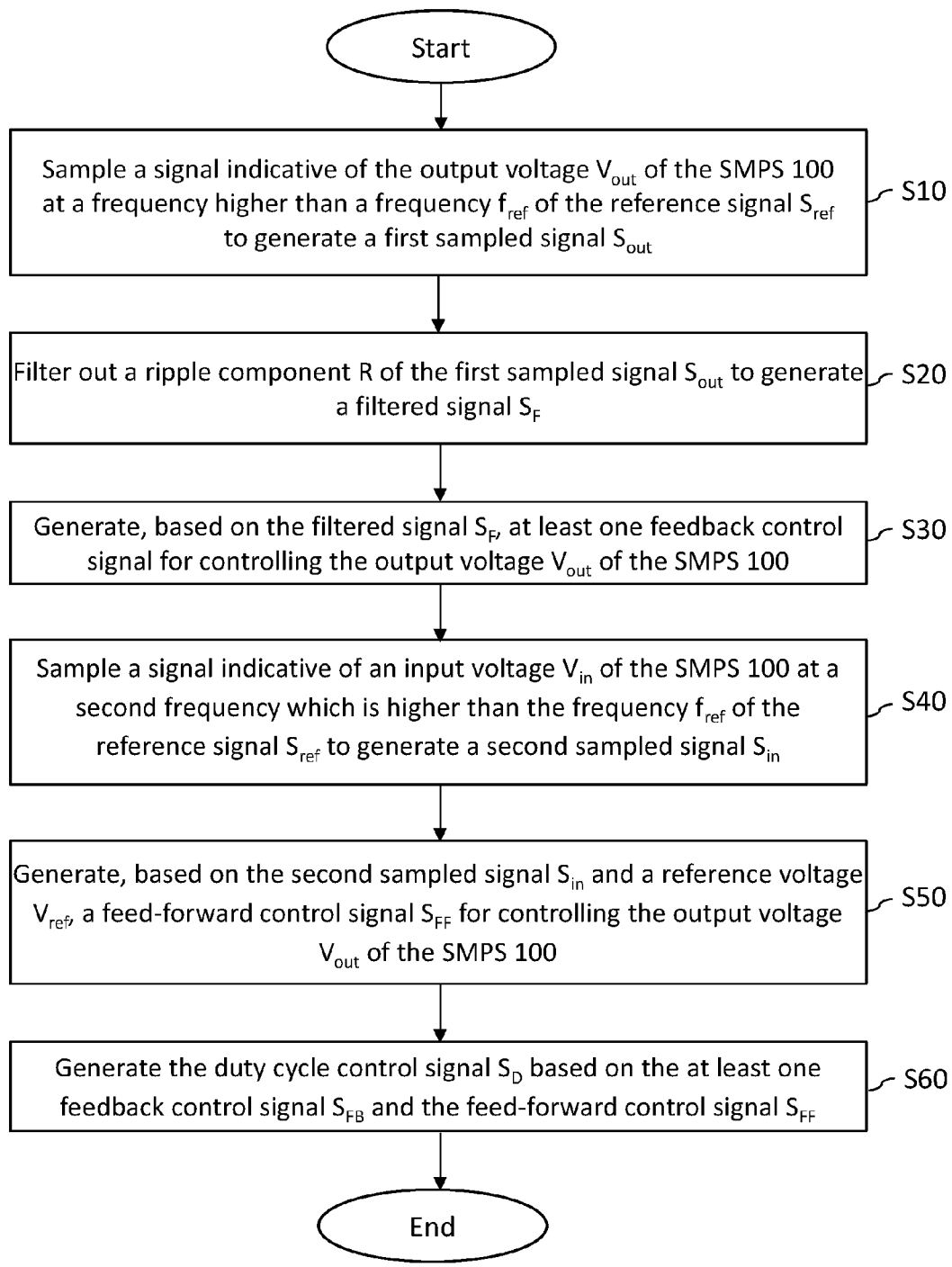
FIG. 8 is a flow diagram illustrating operations performed by the controller in the first embodiment to generate control signals for controlling the output voltage of the SMPS.

In the present embodiment, the combination 370 of the hardware components shown in FIG. 7, comprising the processor 320, the working memory 330 and the instruction store 340, is configured to implement the functionality of the aforementioned first sampling module 150, filter module 160 (including the ripple component estimation module 162 and the subtraction module 164), feedback control signal generator 170, second sampling module 180, feed-forward control signal generator 190 and combining module 200, which will now be described in detail with reference to FIG. 8.

FIG. 8 is a flow chart illustrating operations performed by the controller 140 in the first embodiment to generate the duty cycle control signal $S_D$.

In step S10, the first sampling module 150 samples the error signal E (as an example of a signal indicative of the output voltage of the SMPS 100) at a first frequency higher than the frequency of the reference signal, $S_{ref}$. The error signal E may, as in the present embodiment, be sampled at a frequency that is an integer multiple N of the frequency, $f_{ref}$, of the reference signal $S_{ref}$.

In step S20, the filter module 160 filters out a ripple component of the first sampled signal $S_{out}$ to generate the filtered signal, $S_F$. In the present embodiment, where the filter module 160 is configured as shown in FIG. 2, the ripple component estimation module 162 thereof estimates in step S20 the ripple component R by calculating, for each or some of the samples in the first sampled signal $S_{out}$, an average sample value using the sample value and sample values obtained at corresponding points in preceding periods of $S_{ref}$, the sample at each of said corresponding points being separated from the latest sample under consideration by a respective integer number of periods of the reference signal $S_{ref}$. More particularly, in the present embodiment, the ripple component estimation module 162 calculates a weighted average of the sample values including the sample value, in the time window for each of the aforementioned N sets of samples. As explained above, the ripple component estimation module 162 estimates the ripple component R using an interpolated low-pass filter in the exemplary form of a first-order interpolated recursive moving average filter, as illustrated in FIG. 4. As noted above, the ripple component estimation module 162 may alternatively estimate the ripple component R in step S20 using a first-order interpolated low-pass filter in the form of an interpolated FIR filter (e.g. an interpolated moving average filter). As a further alternative, higher-order interpolated low-pass filters may be used. The subtraction module 164 then subtracts the estimated ripple component R from the sampled signal to generate a filtered signal, $S_F$.

Next, in step S30, the feedback control signal generator 170 generates at least one feedback control signal $S_{FB}$ based on $S_F$. One example of how this may be done will now be described in more detail.

In Step S30, the above-described first component (specifically, the scaling module 170-1) scales sample values of the filtered signal $S_F$ by a first scaling factor $K_P$ to generate a first feedback control signal. The down-sampling module 170-2 generates a down-sampled signal $S_{DC}$ by sampling, at the frequency $f_{ref}$ of the reference signal $S_{ref}$, a signal based on the first sampled signal $S_{out}$. Step S30 may, as in the present embodiment, comprise the block moving average filter 170-3 calculating a respective average of samples obtained in each period of $S_{ref}$, and the down-sampling module 170-2 generating the down-sampled signal $S_{DC}$ by sampling the calculated average at the frequency $f_{ref}$ of the reference signal $S_{ref}$. A value of the down-sampled signal is then stored in the storage module 170-4.

The above-described second component of the PID controller 170 generates the second feedback control signal by calculating values of a product of the second scaling factor $K_d$ and the difference signal, i.e. the difference between each sample value in the filtered signal $S_F$ and the stored value of the down-sampled signal, wherein each value of the difference signal represents the difference between a respective value of the filtered signal $S_F$ that is based on a respective one or more samples obtained during a period of the reference signal, and a value of the down-sampled signal that is based on at least one sample obtained in the previous period of the reference signal. Where the second component comprises a difference calculating module 170-5 and a second scaling module 170-6, as in the present embodiment, the aforementioned product is calculated by the difference calculating module 170-5 calculating the difference between a value of $S_F$ and the value stored in the storage module 170-4, and the second scaling module 170-6 scaling the result by the factor $K_d$. The third component scales the down-sampled signal $S_{DC}$ by a third scaling factor $K_i$, and accumulates values of the scaled, down-sampled signal to generate a third feedback control signal. Where the third component is implemented in the form of a circuit as shown in FIG. 5, as in the present embodiment, the third scaling module 170-7 scales the down-sampled signal $S_{DC}$ by the factor $K_i$, and the summing module 170-8 and delay module 170-9 accumulate values of the scaled, down-sampled signal to generate the third feedback control signal.

In step S40, the second sampling module 180 generates a second sampled signal, $S_{in}$, by sampling the input voltage $V_{in}$ (as an example of a signal indicative of the input voltage of the SMPS 100) at a second frequency that is higher than the frequency of the reference signal, $S_{ref}$. The input voltage may, as in the present embodiment, be sampled at a frequency that is an integer multiple M of the frequency, $f_{ref}$, of the reference signal $S_{ref}$. As mentioned above, N=M in the present embodiment, although, in general, the sampling rates of the first and second sampling modules may differ.

In step S50, the feed-forward control signal generator 190 generates, based on the signal indicative of the input voltage $V_{in}$ of the SMPS 100 and a reference voltage $V_{ref,FF}$, a feed-forward control signal $S_{FF}$ for controlling the output voltage $V_{out}$ of the SMPS 100. As described above, the reference voltage $V_{ref,FF}$ may, as in the present embodiment, be the same as the reference voltage $V_{ref}$ used to obtain the error signal E in the feedback loop. Alternatively, the reference voltage $V_{ref,FF}$ may be different to $V_{ref}$, for example a value indicative of the maximum expected output voltage of the SMPS, or a value indicative of the minimum expected output voltage of the SMPS 100. More specifically, in step S50, the feed-forward control signal generator 190 outputs calculated values of the ratio $V_{ref}/S_{in}$ as the feed-forward control signal $S_{FF}$. In alternative embodiments, where the SMPS 100 is of the boost or buck-boost topology, the feed-forward control signal generator 190 outputs in step S50, as the feed-forward control signal $S_{FF}$, calculated values of the ratio $1-S_{in}/V_{ref}$ and $[1-S_{in}/V_{ref}]^{-1}$, respectively. As noted above, appropriate forms of $S_{FF}$ may be selected for other SMPS topologies by those skilled in the art.

Finally, in step S60, the combining module 200 generates the duty cycle control signal $S_D$ based on the feed-forward control signal $S_{FF}$ and the feedback control signals. More specifically, in the present embodiment, the combining module 200 initially subtracts the Derivative feedback control signal from the Integral feedback control signal in a first combining operation that is performed by subtraction module 200-1. The combining module 200 then combines, in a second combining operation that is performed by the addition module 200-2, the Proportional feedback control signal to the combination of the Derivative and Integral feedback control signals output by the subtraction module 200-1. Finally, the addition module 200-3 combines the feed-forward control signal $S_{FF}$ with the output of addition module 200-2 to generate the duty cycle control signal $S_D$.

Figure 9A:
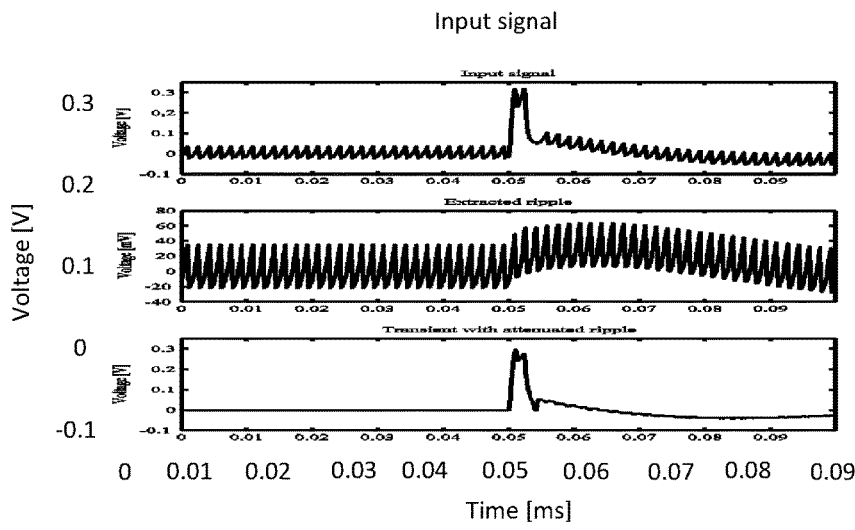
FIGS. 9A to 9C show simulations of the input signal, the estimated ripple component and the transient with attenuated ripple in the first embodiment.
Figure 9B:
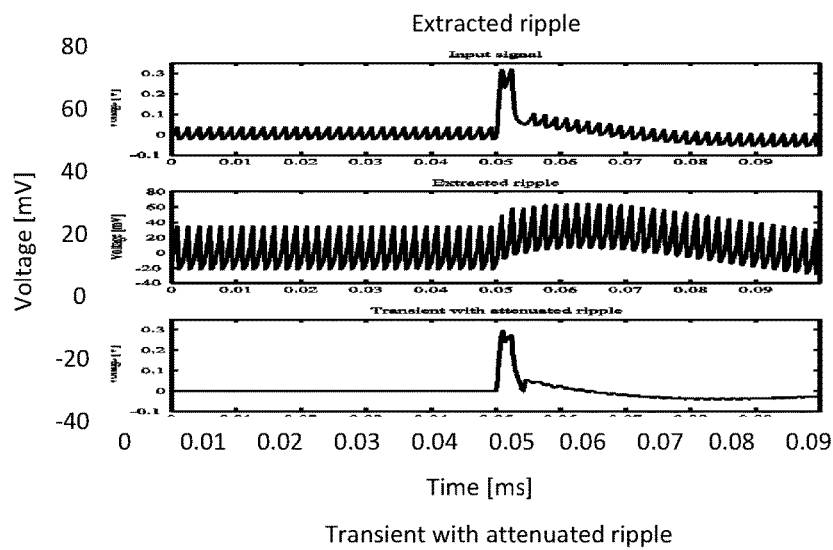
Figure 9C:
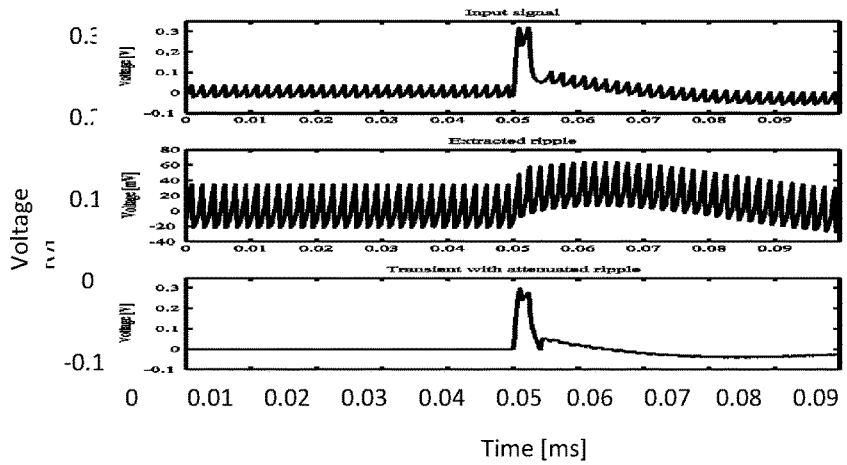

The ability of the filter module 160 of the present embodiment to effectively suppress the ripple component without significantly delaying or distorting the underlying feedback signal is illustrated in the simulation results in FIGS. 9A to 9C. FIG. 9A shows a simulation of the feedback signal input to the filter module 160 over a period of 0.1 ms, FIG. 9B shows the ripple component estimated by the ripple component estimation module 162 during that period, and FIG. 9C shows the simulated output of the filter module 160. In this example, the factor k (see FIG. 4 and the accompanying description thereof above) is set to 19. As shown in FIG. 9C, a good, essentially ripple-free transient signal is obtained. However, in the ripple trace in FIG. 9B, the voltage transient is readily apparent, with the peak of the transient appearing about 20 mV above the ripple's peak value.

Figures 10A, 10B, 10C:
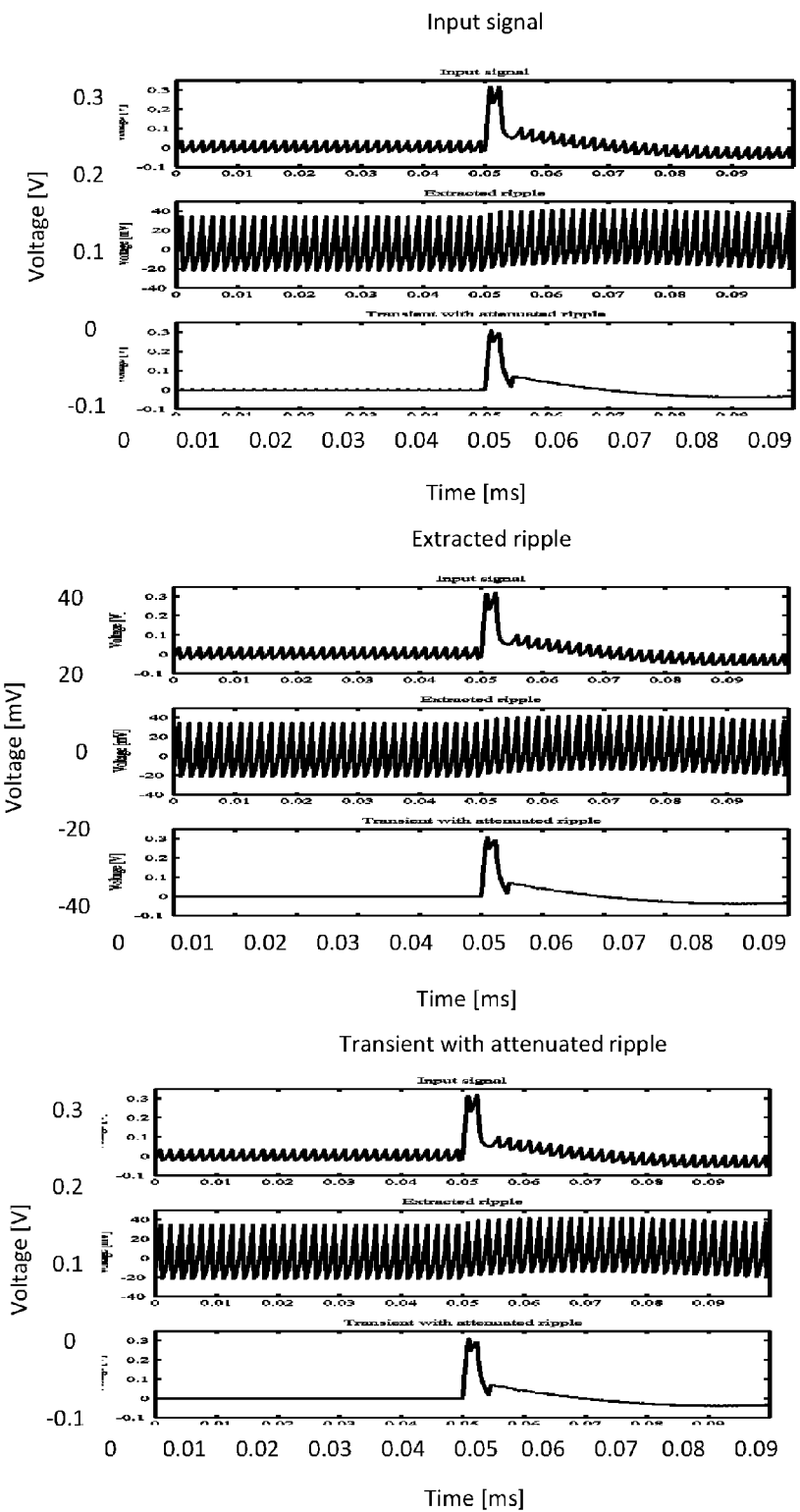
FIGS. 10A to 10C show simulations of the input signal, the estimated ripple component and the transient with attenuated ripple in a modification of the first embodiment.

A simple improvement of the transient attenuation in the ripple extraction is to increase the factor k. Simulations with k=100 are shown in FIGS. 10A to 10C. In this variation of the first embodiment, the transient in the estimated ripple component is only a few millivolts above the normal ripple. However, the draw-back of this variation is that the filter takes a relatively long time to adjust for changes in the ripple due to, e.g. changes in the load level or the input voltage $V_{in}$. The group delay is k−1 samples for low frequencies, i.e. the pass-band of the filter. Using a corresponding interpolated FIR filter with similar attenuation as the recursive filter with k=100 would have a filter length of N×k and a group delay of Nk/2, which will be very long in many cases and require a lot of memory.

Figure 11:
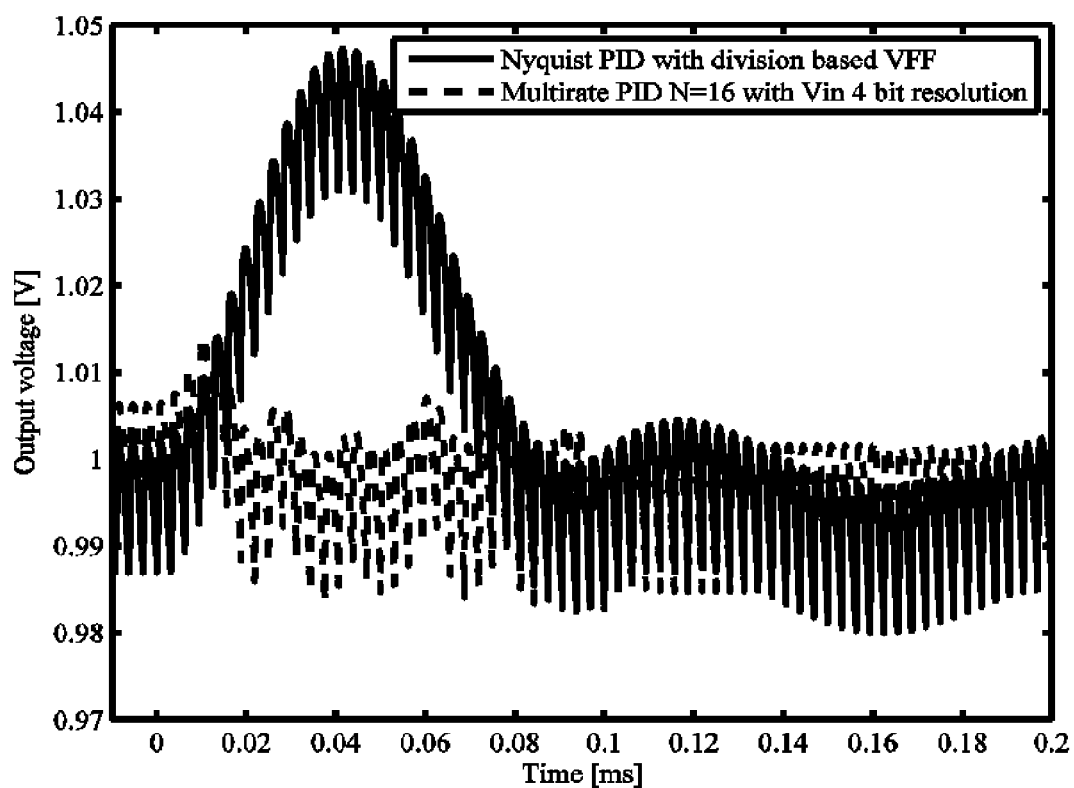
FIG. 11 shows a simulation of the response of a conventional SMPS to an input voltage step and, for comparison, simulations of the response to such input voltage step of an SMPS according to an embodiment having the same P, I and D values.

In FIG. 11, a comparison is made between the performance of a conventional Nyquist-sampled PID controller having exact division-based VFF control loop and a multi-rate PID controller according to an embodiment of the present invention, which uses an analog-to-digital converter for each sampling module with 4-bit resolution, yielding a quantization step of 1 V and an input voltage range of 0 to 15 V. In these simulations, N=M=16, the output voltage is 1 V, and the reference signal frequency $f_{ref}$ is 320 kHz. The input voltage is step is from 5.4 to 11.4 V with a rise time of 1 ms, which corresponds to 32 switch cycles. As shown in FIG. 11, the voltage deviation is about 40 mV for the Nyquist-sampled PID controller, and 10 mV for the multi-rate PID controller of the embodiment, which uses a look-up table with 16 different values. This can be compared with 5 mV deviation when using multi-rate PID with exact division-based VFF.

Embodiment 2

An effective approach to suppressing the appearance of the transient in the extracted ripple component is to increase the order of the filter in the ripple component estimation module 162 to two or higher. The present embodiment is based on this approach and differs from the first embodiment by the provision in the ripple component estimation module 162 of a low-pass filter in the form of a Chebychev Type 2 filter of order three, with a normalized band stop frequency of 0.1, where 1 corresponds to the Nyquist frequency and the attenuation in the stop band is 80 dB. Aside from the replacement of the first-order interpolated recursive moving average filter with the aforementioned Chebychev filter, the present embodiment is otherwise the same as the first embodiment.

Figures 12A, 12B, 12C:
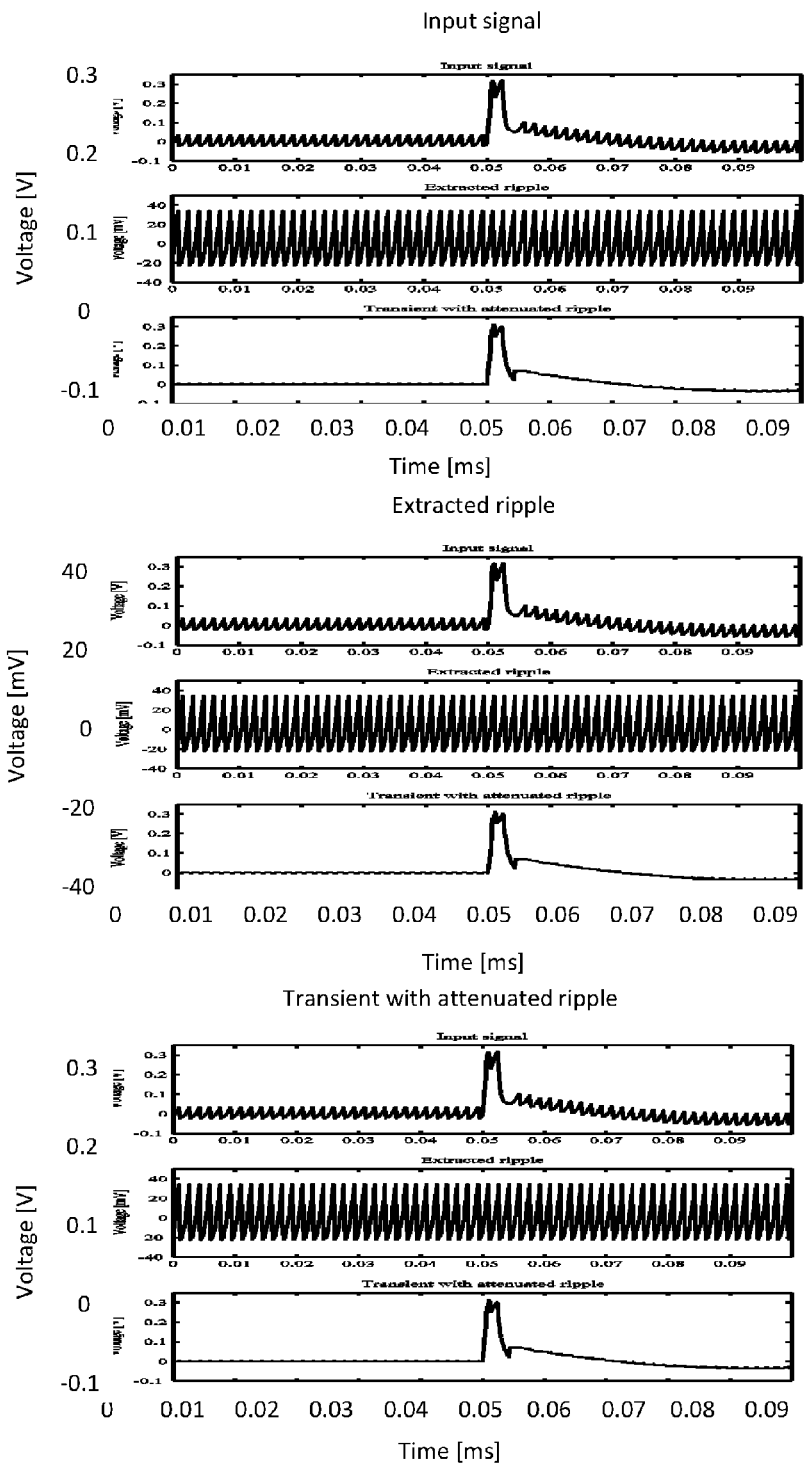
FIGS. 12A to 12C show simulations of the input signal, the estimated ripple component and the transient with attenuated ripple in a second embodiment of the present invention.

Simulation results for the second embodiment are shown in FIGS. 12A to 12C, from which it is clear that the transient in the ripple component is virtually eliminated (see FIG. 12B). By appropriate design of the higher-order filter, the latency can be reduced compared with the extremely low bandwidth first-order filter (i.e. the above-described variant of the first embodiment, where the filter has a large value of k). Using the filter of the present embodiment, the group delay in the pass band is about 80 samples. This can be reduced by increasing the stop band limit, e.g. a limit of 0.15 reduces the group delay to 55 samples, without greatly affecting the transient attenuation.

Embodiment 3

Figure 13:
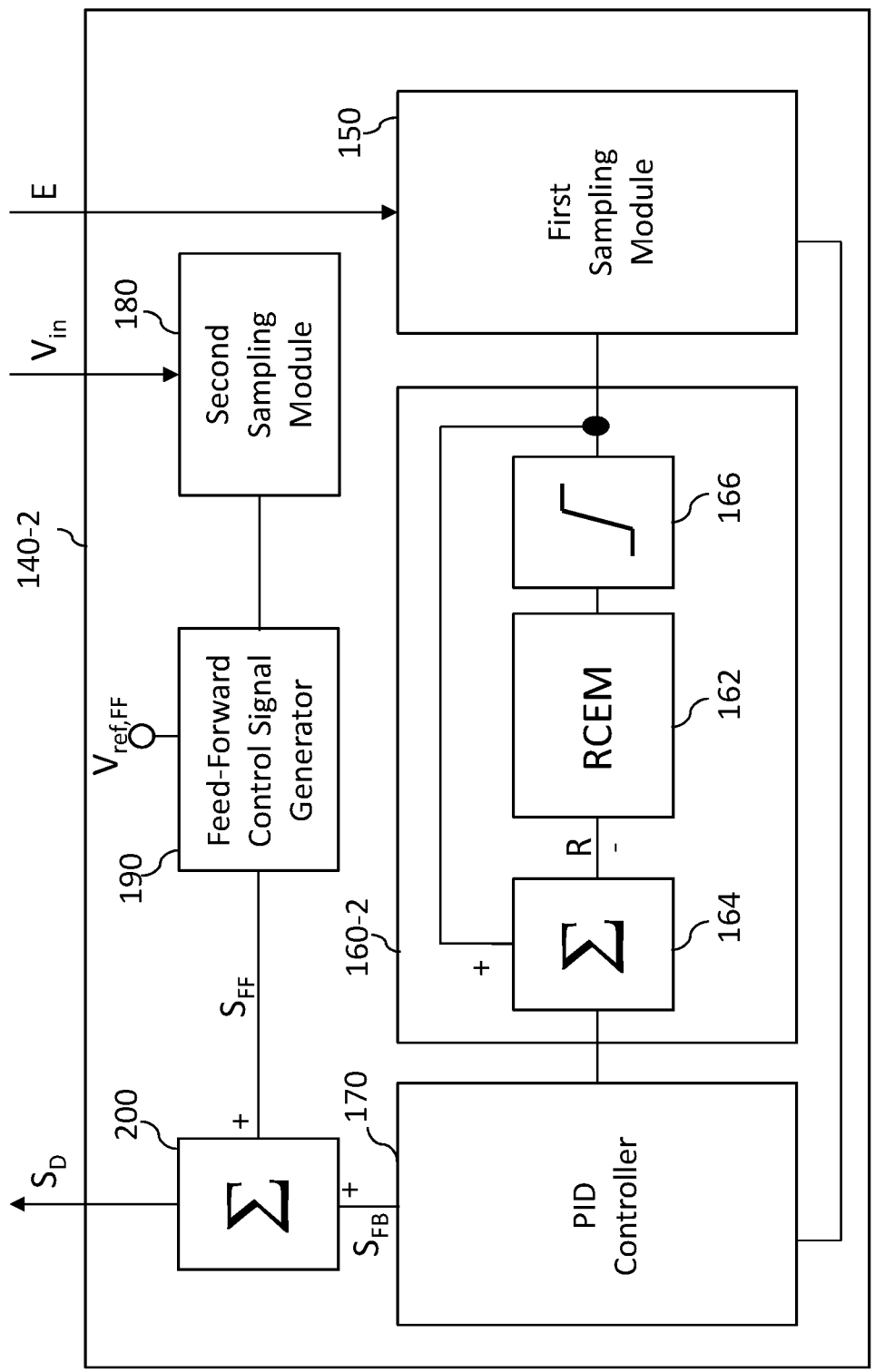
FIG. 13 shows functional components of a controller according to a third embodiment of the present invention.

Another effective but simpler approach to suppressing the appearance of the transient in the extracted ripple component is to saturate the signal input to the ripple component estimation module 160 just above the normal ripple level. The present embodiment is based on this approach and differs from the first and second embodiments by the modified filter module 160-2 of the present embodiment further comprising, as shown in FIG. 13, a clipping module 166 that is arranged to process the first sampled signal $S_{out}$ by clipping the sampled signal when it exceeds a threshold level, preferably just above the normal ripple level (e.g. 2, 5 or 10% above the ripple level during stable operation of the SMPS, when no voltage transients occur). In other words, the clipping module 166 performs a signal clipping operation, allowing the signal input thereto to pass through unchanged if the amplitude of the input signal is below the threshold level, and outputting a signal at the threshold level when the input signal amplitude is at or above the threshold level. The present embodiment is otherwise the same as the first embodiment. In the present embodiment, the ripple component estimation module 162 is arranged to estimate the ripple component R by calculating, for each of a plurality of samples of the processed signal, an average of the sample value and the values of samples at corresponding points in preceding periods of the reference signal $S_{ref}$ that have been sampled and processed. The controller of the second embodiment may be similarly modified to comprise a clipping module 166 as described above.

The operations performed by the controller 140-2 of the present embodiment are as described above with reference to FIG. 8, except that a further step is performed, between steps S10 and S20, of processing the sampled signal by clipping the sampled signal when it exceeds a threshold. In this case, the ripple component is estimated (in a modified version of step S20) by calculating, for each of the plurality of samples in the processed signal, an average of the sample value and the values of samples at corresponding points in preceding periods of $S_{ref}$ that have been sampled and processed.

Figure 14A:
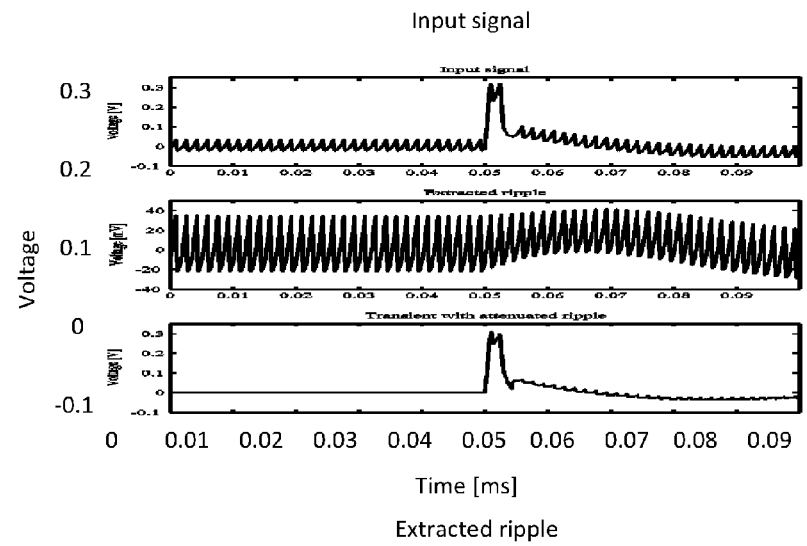
FIGS. 14A to 14C show simulations of the input signal, the estimated ripple component and the transient with attenuated ripple in the third embodiment of the present invention.
Figure 14B:
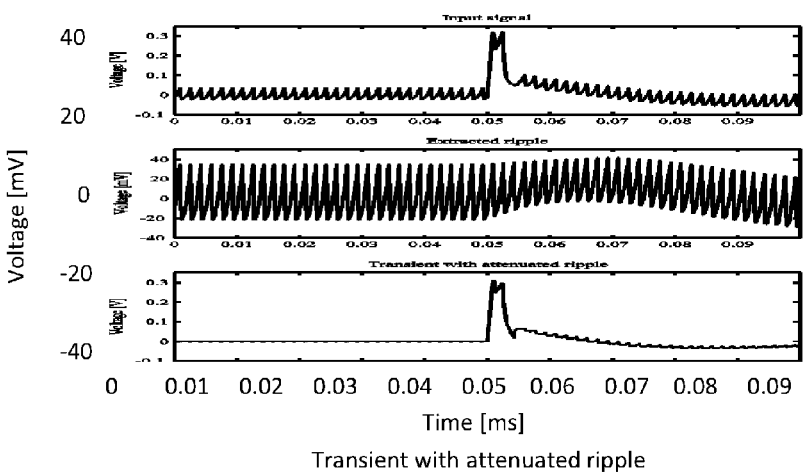
Figure 14C:
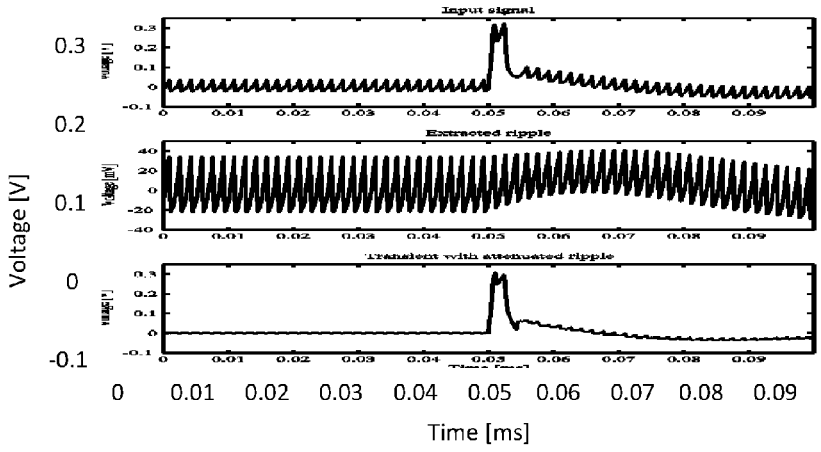

Simulation results for the third embodiment are shown in FIGS. 14A to 14C. In this simulation, the saturation limits in the clipping module 166 were set to ±50 mV. As seen in FIG. 14B, the ripple component estimate becomes a little distorted during the transient but the peak level is similar to the normal ripple. In the transient signal (FIG. 14C), the ripple shows up after the transient has occurred, due to the ripple signal having an offset.

Embodiment 4

Figure 15:
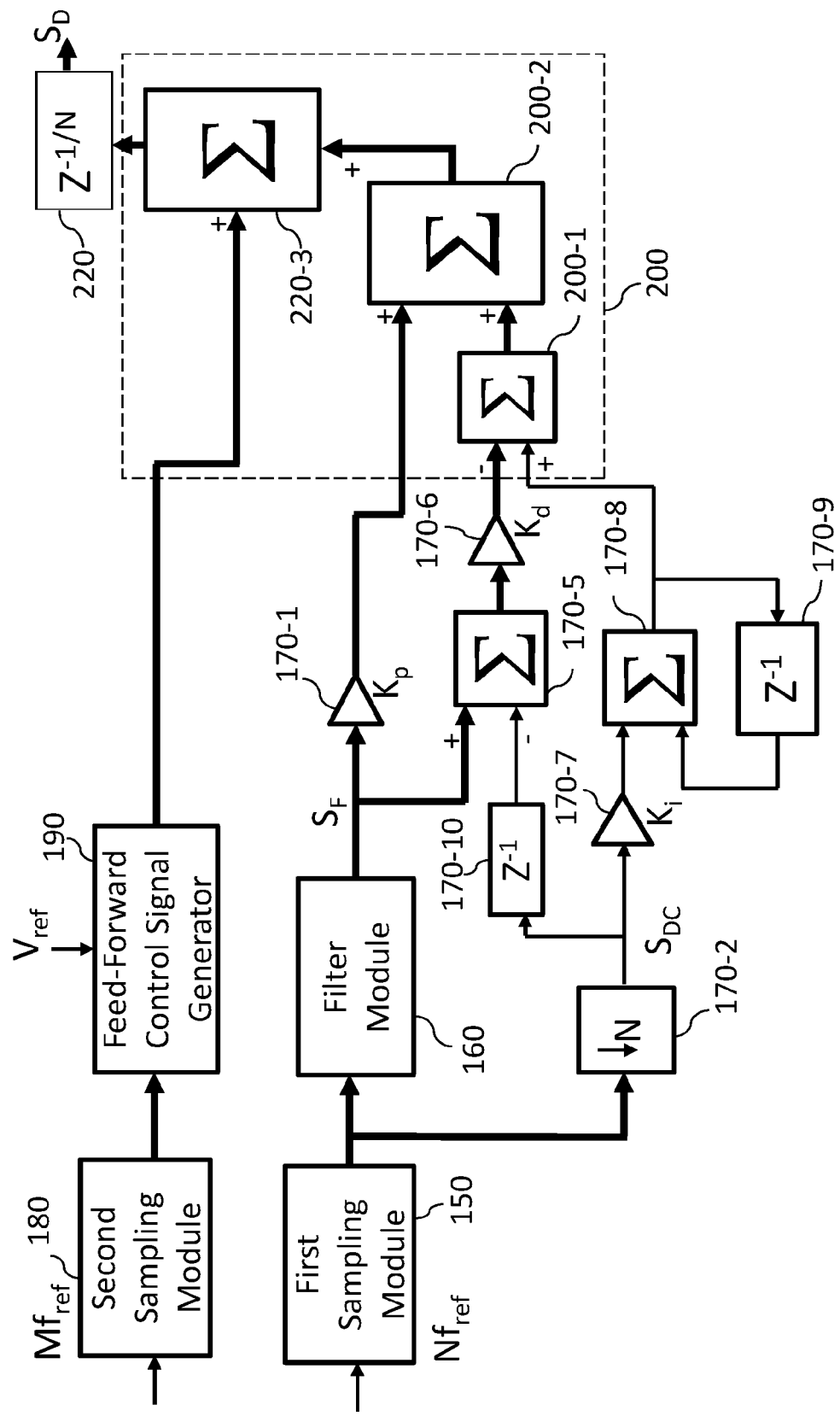
FIG. 15 is a schematic showing components of a controller according to a fourth embodiment of the present invention.

FIG. 15 shows a controller according to a fourth embodiment of the invention, which is a variant of the first embodiment. The present embodiment differs from the first embodiment by not having the block moving average filter 170-3. Instead, the down-sampling module 170-2 is arranged to generate the down-sampled signal $S_{DC}$ by sampling, at the frequency $f_{ref}$, the signal output by the first sampling module 150. In this variant, the feedback control signal generator is a PID controller which is arranged such that use by the Derivative component of the value of the down-sampled signal $S_{DC}$ that has been stored during a period of the reference signal $S_{ref}$, to calculate the Derivative feedback control signal, is delayed until the following period of the reference signal $S_{ref}$. In the variant of FIG. 15, this delay is represented by the delay element 170-10, which functions to store a received value of the signal $S_{DC}$ and make the stored value available to the difference calculating module 170-5 in the next period. On the other hand, in the first embodiment, this delay is provided by the block moving average filter 170-3. The greater simplicity of the circuit of the fourth embodiment comes at a cost of reduced DC error accuracy. However, if a significant DC error is present, it may be trimmed out by calibration, for example by adding a DC offset to the output of the down-sampling module 170-2.

The above-described modification to the first embodiment may also be made to the second and third embodiments.

Embodiment 5

Figure 16:
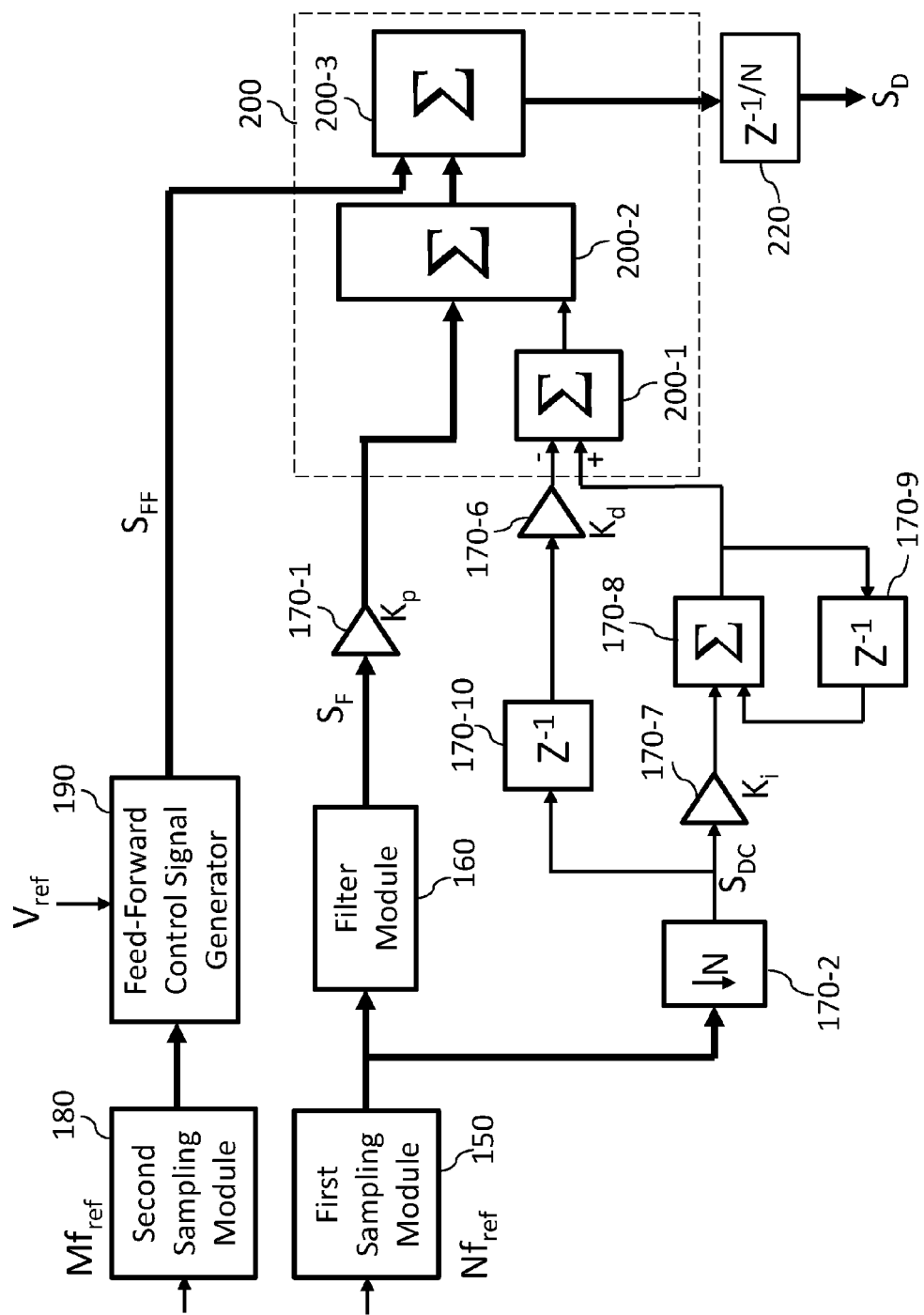
FIG. 16 is a schematic showing components of a controller according to a fifth embodiment of the present invention.

In embodiments where the feedback control signal generator 170 is a PID controller, the circuit of the PID controller may be analysed using difference equations, shown in computable order with memory updates, which can be used when implementing the controller in a digital signal processor (DSP). This approach (described further in co-pending application PCT/EP2015/066052) can be used to derive an alternative form of the controller 140, which is illustrated in FIG. 16. This controller constitutes a fifth embodiment of the present invention.

The illustrated arrangement minimises the critical path, i.e. the path with longest computation. In FIG. 16, components that have already been described above are labelled with like reference signs. The embodiment of FIG. 16 differs from that of FIG. 15 by the illustrated reconfiguration of first and second components of the PID controller. More particularly, in the variant shown in FIG. 16, the first component (specifically, scaling module 170-1b) is arranged to scale sample values of the filtered signal $S_F$ by a first scaling factor of $K_{p+d} = K_p + K_d$ to generate a first feedback control signal. The second component is arranged to generate a second feedback control signal by calculating values of a product of a second scaling factor $K_d$ and the stored value of the down-sampled signal, specifically by the scaling module 170-6 scaling the value stored in the storage module 170-10 by the factor $K_d$.

In the PID controller shown in FIG. 16, the combining module 200 is arranged to generate the duty cycle control signal $S_D$ by combining the feed-forward control signal $S_{FF}$ with the first, second and third feedback control signals such that each calculated value of the duty cycle control signal $S_D$ represents a sum of the feed-forward control signal $S_{FF}$ and the difference between: (i) the sum of a respective value of the first feedback control signal that is based on a respective one or more samples obtained by the first sampling module 150 during a period of the reference signal $S_{ref}$, and respective value of the third feedback control signal that is based on accumulated values of the scaled, down-sampled signal $S_{DC}$ that have been obtained by the down-sampling module 170-2 in preceding periods of the reference signal $S_{ref}$; and (ii) a value of the second feedback control signal that is based on at least one sample obtained by the first sampling module 150 in a preceding period of the reference signal $S_{ref}$.

Figure 17:
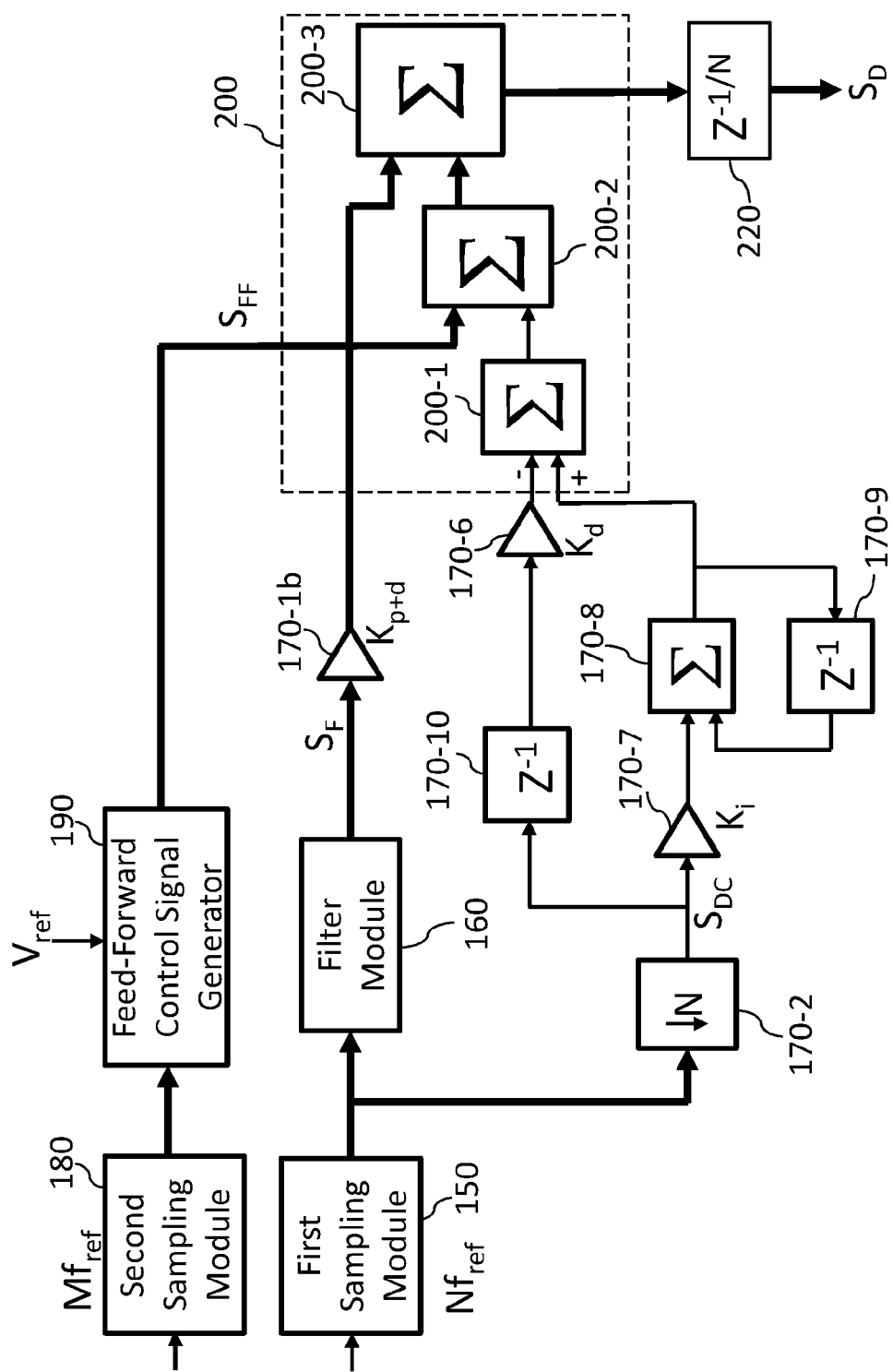
FIG. 17 shows a variant of the fifth embodiment of the present invention.

FIG. 17 shows a variant of the controller of the fifth embodiment, in which the combining module 200 of the fifth embodiment has been modified to reflect a different prioritisation of the feed-forward control signal and feedback control signals required by the user. The variant shown in FIG. 17 may be preferred in some applications, depending on the properties of the input voltage and the output filter of the SMPS.

Embodiment 6

Figure 18:
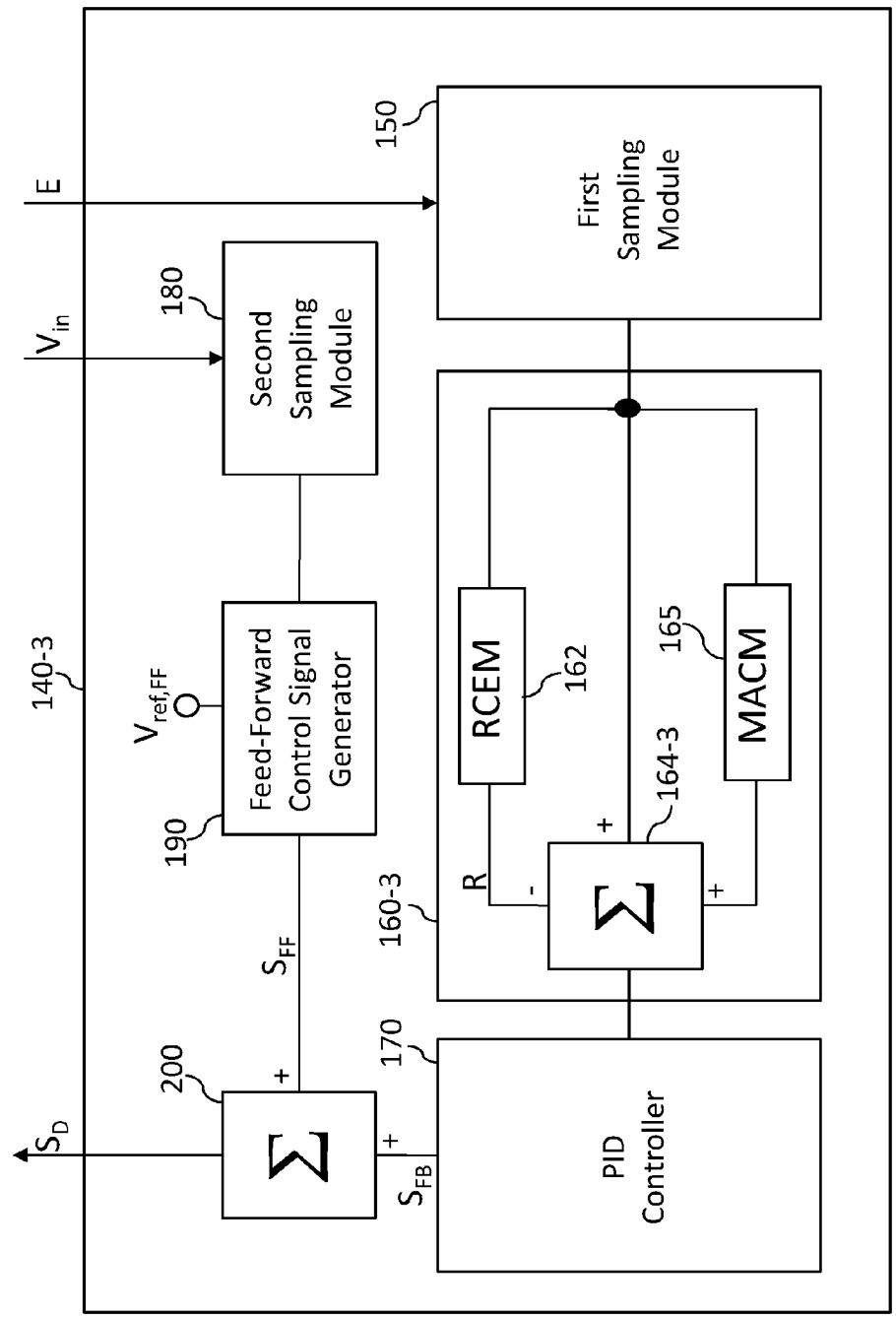
FIG. 18 is a schematic showing components of a controller according to a sixth embodiment of the present invention.

The configurations of the filter module described above allow the ripple component to be effectively suppressed whilst allowing variations in the output voltage $V_{out}$ of the SMPS to propagate to the feedback control signal generator module 170, provided that those output voltage variations occur on a time scale that is not much longer than the aforementioned time window that is used by the ripple component estimation module 162 to calculate the average sample values. This is because, during operation of the SMPS 100 in the case where $V_{out}$ is essentially constant on the time scale of the averaging window, the result of subtracting the estimated ripple component from the sampled output voltage signal is substantially zero, regardless of the value of $V_{out} - V_{ref}$. In order to make the filter module more effective in suppressing slow drifts of the output voltage of the SMPS 100 from the target value, the filter module may be adapted to further comprise a moving average calculation module that is arranged to calculate a moving average of the first sampled signal by calculating, for each sample of a plurality of the samples in the signal, an average (e.g. a mean) of a predetermined number of preceding sample values (e.g. in the case of the first or third embodiment, kN preceding sample values). In this variant, the subtraction module would be arranged to generate the filtered signal by subtracting the estimated ripple component from a sum of the first sampled signal and the calculated moving average. A controller 140-3 according to such a variant is illustrated in FIG. 18, where the modified filter module 160-3 comprises a RCEM 162 as in the first embodiment, as well as a moving average calculation module (MACM) 165 and a modified subtraction module 164-3. The MACM 165 effectively suppresses any DC output voltage error/offset that might be introduced into the system (e.g. at start-up of the SMPS 100). In this sixth embodiment, the process described above with reference to FIG. 8 would be modified by inclusion of an additional step (performed either between steps S10 and S20 or between steps S20 and S30, or in parallel with step S20) of calculating a moving average of the first sampled signal by calculating, for each sample of a plurality of the samples in the first sampled signal, an average of a predetermined number of preceding sample values. The filtered signal would then be generated by subtracting the estimated ripple component R from a sum of the first sampled signal and the calculated moving average in a modified version of step S20.

Figure 19:
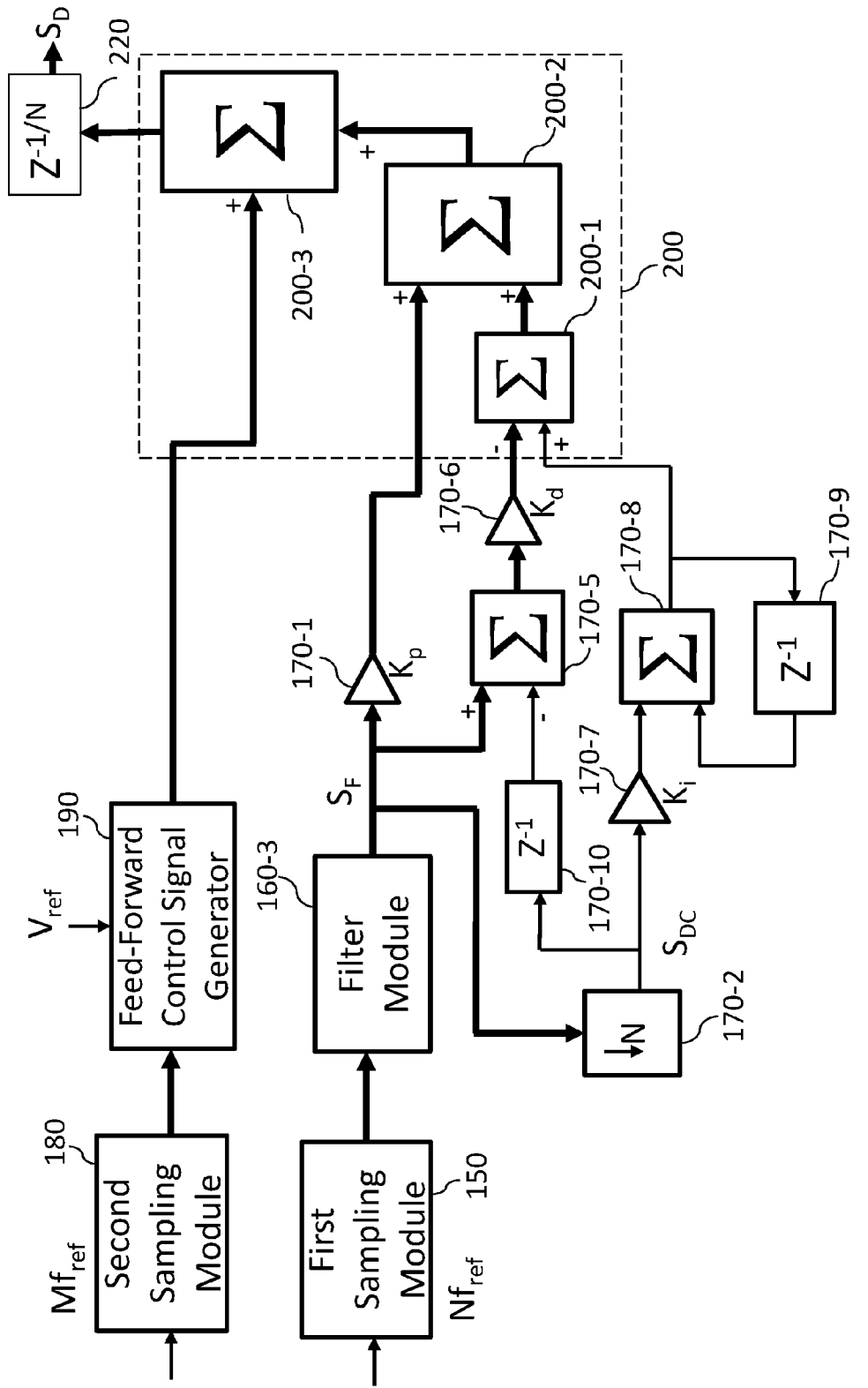
FIG. 19 is a schematic showing further details of the controller 140-3 of the sixth embodiment.

Further details of the controller of the sixth embodiment are shown in FIG. 19. The controller of the sixth embodiment is a variant of the controller of the fourth embodiment described above with reference to FIG. 15, and has the filter module 160-3 shown in FIG. 18 in place of the filter module 160 of the fourth embodiment, and is arranged such that the down-sampling module 170-2 generates the down-sampled signal $S_{DC}$ by sampling, at $f_{ref}$, the filtered signal $S_F$ (rather than the signal from the first sampling module 150 before it has been filtered by the filter module 160-3), and such that use by the second component of the value of the down-sampled signal that has been stored in the delay element 170-10 during a period of the reference signal, to calculate the second feedback control signal, is delayed until the following period of the reference signal.

Figure 20:
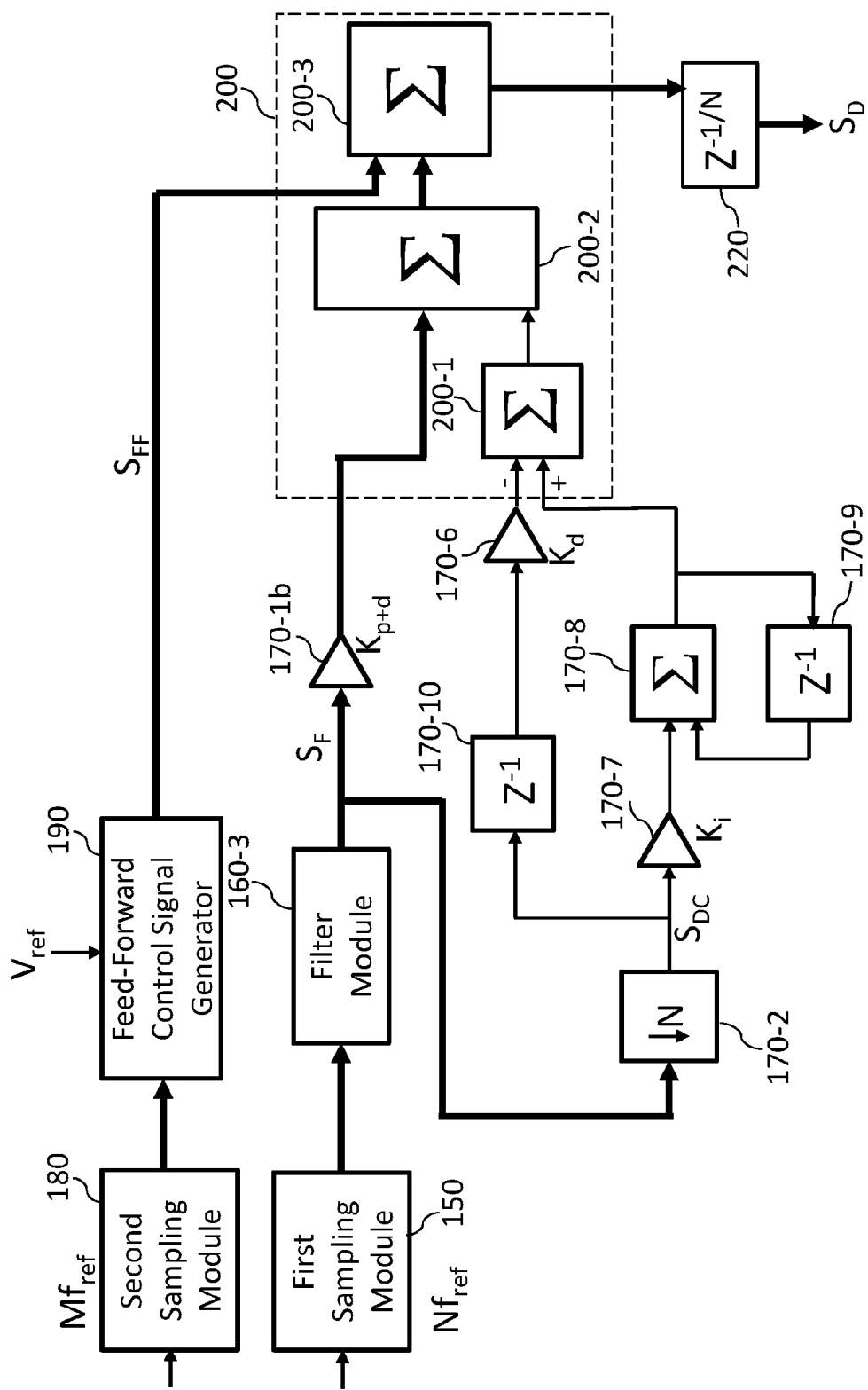
FIG. 20 is a schematic showing components of a controller according to variant of the sixth embodiment.

The sixth embodiment may be modified in the same way as described above with reference to FIG. 16. The correspondingly modified controller circuit is shown in FIG. 20, where circuit elements that have already been described are labelled with like reference signs.

Modifications and Variations

Many modifications and variations can be made to the embodiments described above.

For example, the ordering of steps S20 to S70 in FIG. 8 may differ from that illustrated. For instance, the processes in steps S20 and S30 may be performed after, or in parallel with, steps S40 to S60.

As another possible modification, in the above-described embodiments, the subtraction module 130 could be replaced by a module at the output of the first sampling module 150 (or an operation done by the sampling module itself), which shifts each sample value by a value representative of a target voltage, in order to digitally generate the error signal.

Furthermore, the above-described Chebychev Type-2 filter is only an example of a higher-order filter that is optimized to yield a flat response in the pass-band and equal ripple in the stop-band. Other optimizations, such as Butterworth, Chebychev Type-1, elliptic, or even Bessel could alternatively be used. Another possibility would be a filter optimized for minimizing the number of 1's, which would simplify hardware requirements for the multiplications.

Furthermore, although the controller of the above embodiments is configured to suppress a ripple component of the feedback signal at the frequency of the reference signal $S_{ref}$, the controller may alternatively or additionally have one or more parallel modules arranged to suppress a ripple component of the feedback signal at one or more harmonics of the fundamental frequency of the ripple component. In these embodiments, the sampling frequency could, for example, be set to $N \times 2f_{ref}$ to eliminate the second harmonic, $N \times 3f_{ref}$ to eliminate the third harmonic, etc.

Furthermore, the filter module of the above-described embodiments need not perform its averaging calculations using sample values located at corresponding points in consecutive periods of the ripple component to be filtered out. Thus, adjacent corresponding points considered in the estimation may alternatively be separated from each other by an integer number of ripple periods that is greater than one.

As another modification, the oversampling factor N does not need to be an integer. If, for example, N was set to 16.5, the received signal would be sampled at corresponding points every two periods of the reference signal. The filter module 160, 160-2 or 160-3 would in that case estimate an average sample value by using sample values which are separated from the sample by an even integer number of switching periods (i.e. multiple of 2).

The invention claimed is:

1. A controller configured to generate a duty cycle control signal for controlling an output voltage of a switched mode power supply as a function of an oscillatory reference signal, comprising:
   a first sampling module configured to sample a signal indicative of said output voltage at a first frequency that is higher than a frequency of said oscillatory reference signal to generate a first sampled signal;
   a filter module configured to filter out a ripple component of said first sampled signal to generate a filtered signal;
   a feedback control signal generator configured to generate a feedback control signal based on said filtered signal;
   a second sampling module configured to sample a signal indicative of an input voltage of said switched mode power supply at a second frequency that is higher than said frequency of said oscillatory reference signal to generate a second sampled signal;
   a feed-forward control signal generator configured to generate a feed-forward control signal based on said second sampled signal and a feed-forward reference voltage; and
   a combining module configured to generate said duty cycle control signal based on said feedback control signal and said feed-forward control signal.

2. The controller as recited in claim 1 wherein said feedback control signal generator is configured to generate a plurality of feedback control signals and said combining module is configured to generate said duty cycle control signal based on a priority assigned to said plurality of feedback control signals and said feed-forward control signal.

3. The controller as recited in claim 1 wherein said feedback control signal generator is a Proportional-Integral-Derivate controller, comprising:
   a first component configured to scale values of said filtered signal by a first scaling factor to generate a first feedback control signal;
   a down-sampling module configured to generate a down-sampled signal by sampling, at said frequency of said oscillatory reference signal, a signal based on said first sampled signal;
   a storage module configured to store a value of said down-sampled signal;
   a second component including a second scaling factor and configured to generate a second feedback control signal based on said value of said down-sampled signal; and
   a third component configured to generate a third feedback control signal by scaling said value of said down-sampled signal by a third scaling factor and accumulating scaled values of said down-sampled signal, said combining module being configured to generate said duty cycle control signal based on said first, second and third feedback control signals and said feed-forward control signal.

4. The controller as recited in claim 3 wherein said second component is configured to generate said second feedback control signal by scaling said value of said down-sampled signal by said second scaling factor.

5. The controller as recited in claim 3 wherein said second component is configured to generate said second feedback control signal by calculating a difference signal from said values of said filtered signal and said value of said down-sampled signal, and scaling said difference signal by said second scaling factor.

6. The controller as recited in claim 3 wherein said second component is configured to generate said second feedback control signal following a delay until a following period of said oscillatory reference signal.

7. The controller as recited in claim 3 wherein said feedback control signal generator further comprises a block moving average filter configured to calculate an average of samples of said first sampled signal and said down-sampling module is configured to generate said down-sampled signal based on said average.

8. The controller as recited in claim 1 wherein said filter module comprises:
   a ripple component estimation module configured to provide an estimate of said ripple component; and
   a subtraction module configured to generate said filtered signal based on said estimate of said ripple component and said first sampled signal.

9. The controller as recited in claim 8 wherein said filter module further comprises a clipping module configured to clip said first sampled signal beyond a threshold.

10. The controller as recited in claim 1 wherein said filter module, comprises:
    a ripple component estimation module configured to provide an estimate said ripple component;
    a moving average calculation module configured to calculate an average of samples of said first sampled signal; and
    a subtraction module configured to generate said filtered signal based on said estimate of said ripple component, said average of samples of said first sampled signal and said first sampled signal.

11. The controller as recited in claim 1 wherein said signal indicative of said output voltage comprises a difference between said output voltage and a reference voltage.

12. A method for generating a duty cycle control signal for controlling an output voltage of a switched mode power supply as a function of an oscillatory reference signal, comprising:

sampling a signal indicative of said output voltage at a first frequency that is higher than a frequency of said oscillatory reference signal to generate a first sampled signal;

filtering out a ripple component of said first sampled signal to generate a filtered signal;

generating a feedback control signal based on said filtered signal;

sampling a signal indicative of an input voltage of said switched mode power supply at a second frequency that is higher than said frequency of said oscillatory reference signal to generate a second sampled signal;

generating a feed-forward control signal based on said second sampled signal and a feed-forward reference voltage; and generating said duty cycle control signal based on said feedback control signal and said feed-forward control signal.

13. The method as recited in claim 12 wherein said generating said feedback control signal comprises generating a plurality of feedback control signals and said generating said duty cycle control signal comprises generating said duty cycle control signal based on a priority assigned to said plurality of feedback control signals and said feed-forward control signal.

14. The method as recited in claim 12 wherein said generating said feedback control signal comprises:

scaling values of said filtered signal by a first scaling factor to generate a first feedback control signal, generating a down-sampled signal by sampling, at said frequency of said oscillatory reference signal, a signal based on said first sampled signal, storing a value of said down-sampled signal, generating a second feedback control signal based on said value of said down-sampled signal in accordance with a second scaling factor, and generating a third feedback control signal by scaling said value of said down-sampled signal by a third scaling factor and accumulating scaled values of said down-sampled signal; and said generating said duty cycle control signal comprises generating said duty cycle control signal based on said first, second and third feedback control signals and said feed-forward control signal.

15. The method as recited in claim 14 wherein said generating said second feedback control signal comprises calculating a difference signal from said values of said filtered signal and said value of said down-sampled signal, and scaling said difference signal by said second scaling factor.

16. The method as recited in claim 12 wherein said filtering out said ripple component comprises:

providing an estimate of said ripple component;

calculating an average of samples of said first sampled signal; and generating said filtered signal based on said estimate of said ripple component, said average of samples of said first sampled signal and said first sampled signal.

17. A controller configured to generate a duty cycle control signal for controlling an output voltage of a switched mode power supply, comprising:

a processor; and a memory including computer program code, wherein said processor, said memory, and said computer program code are collectively operable to:

sample a signal indicative of said output voltage to generate a first sampled signal;

filter out a ripple component of said first sampled signal in accordance with an estimate of said ripple component to generate a filtered signal;

generate a feedback control signal based on said filtered signal;

sample a signal indicative of an input voltage of said switched mode power supply to generate a second sampled signal;

generate a feed-forward control signal based on said second sampled signal and a feed-forward reference voltage; and generate said duty cycle control signal based on said feedback control signal and said feed-forward control signal.

18. The controller as recited in claim 17 wherein said memory and said computer program code are further configured to, with said processor cause said controller to generate a plurality of feedback control signals and generate said duty cycle control signal based on a priority assigned to said plurality of feedback control signals and said feed-forward control signal.

19. The controller as recited in claim 17 wherein said memory and said computer program code are further configured to, with said processor cause said controller to:

generate said feedback control signal by:

scaling values of said filtered signal by a first scaling factor to generate a first feedback control signal, generating a down-sampled signal by sampling a signal based on said first sampled signal, storing a value of said down-sampled signal, generating a second feedback control signal based on said value of said down-sampled signal in accordance with a second scaling factor, and generating a third feedback control signal by scaling said value of said down-sampled signal by a third scaling factor, and accumulating scaled values of said down-sampled signal; and generate said duty cycle control signal based on said first, second and third feedback control signals and said feed-forward control signal.

20. The controller as recited in claim 17 wherein said memory and said computer program code are further configured to, with said processor cause said controller to filter out said ripple component by:

calculating an average of samples of said first sampled signal; and generating said filtered signal based on said estimate of said ripple component, said average of samples of said first sampled signal and said first sampled signal.

* * * * *